(12) United States Patent
Funami

(10) Patent No.: US 11,975,410 B2
(45) Date of Patent: May 7, 2024

(54) LASER WELDING QUALITY INSPECTION METHOD AND LASER WELDING QUALITY INSPECTION APPARATUS

(71) Applicant: Panasonic Intellectual Property Management Co., Ltd., Osaka (JP)

(72) Inventor: Koji Funami, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 644 days.

(21) Appl. No.: 17/031,984

(22) Filed: Sep. 25, 2020

(65) Prior Publication Data

US 2021/0107096 A1 Apr. 15, 2021

(30) Foreign Application Priority Data

Oct. 9, 2019 (JP) .................................. 2019-186215

(51) Int. Cl.
  *B23K 31/12* (2006.01)
  *B23K 26/21* (2014.01)
  *B23K 26/70* (2014.01)
(52) U.S. Cl.
  CPC ............ *B23K 31/125* (2013.01); *B23K 26/21* (2015.10); *B23K 26/705* (2015.10)
(58) Field of Classification Search
  CPC ..... B23K 31/125; B23K 26/21; B23K 26/705
  USPC ................................................... 219/121.63
  See application file for complete search history.

(56) References Cited

U.S. PATENT DOCUMENTS

| | | | | |
|---|---|---|---|---|
| 5,069,527 A | * | 12/1991 | Johnston, Jr. .......... | G01J 1/4257 359/380 |
| 2011/0284508 A1 | * | 11/2011 | Miura ................... | B23K 31/125 219/121.64 |
| 2012/0103954 A1 | * | 5/2012 | Yilbas .................... | B23K 26/38 219/121.72 |
| 2012/0285936 A1 | * | 11/2012 | Urashima .......... | G01B 9/02091 219/121.63 |
| 2015/0158119 A1 | * | 6/2015 | Nakamura ........... | B23K 26/034 219/121.64 |
| 2015/0266132 A1 | * | 9/2015 | Kawakita ............... | B23K 26/24 219/121.64 |
| 2016/0052091 A1 | * | 2/2016 | Uchida .................. | B23K 26/21 219/121.64 |

(Continued)

FOREIGN PATENT DOCUMENTS

| | | |
|---|---|---|
| JP | 3154177 B | 4/2001 |
| JP | 2001-191186 | 7/2001 |

(Continued)

*Primary Examiner* — Jimmy Chou
(74) *Attorney, Agent, or Firm* — Rimon P.C.

(57) ABSTRACT

A laser welding quality inspection method of a welded portion between a joining object and a joined object, when the joining object and the joined object are welded by being irradiated with a laser beam, the method includes: acquiring first data indicating a signal intensity of thermal radiation light radiated from the welded portion during the welding; acquiring second data indicating a signal intensity of plasma light radiated from the welded portion during the welding; and determining whether or not the welded portion includes an abnormality based on a comparison between the signal intensity of the thermal radiation light and the signal intensity of the plasma light which are acquired.

10 Claims, 18 Drawing Sheets

(56) References Cited

U.S. PATENT DOCUMENTS

| | | | | |
|---|---|---|---|---|
| 2016/0067832 A1* | 3/2016 | Kobayashi | ........... | B23K 26/032 |
| | | | | 219/121.64 |
| 2016/0193692 A1* | 7/2016 | Regaard | ............... | B23K 31/125 |
| | | | | 219/121.62 |

FOREIGN PATENT DOCUMENTS

| | | |
|---|---|---|
| JP | 2002-239761 | 8/2002 |
| JP | 2002-346776 | 12/2002 |
| JP | 2007-098442 | 4/2007 |
| JP | 2014-205182 | 10/2014 |
| JP | 2017113789 A * | 6/2017 |

* cited by examiner

FIG. 8

|  | NUMBER OF PERFORATIONS (PIECES) | NUMBER OF PIECES (PIECES) | DETERMINATION ○ | DETERMINATION × |
|---|---|---|---|---|
| NORMAL PRODUCT | 0 | 51 | 51 | 0 |
| ABNORMAL PRODUCT | 1 | 25 | 5 | 20 |
| | 2 | 13 | 0 | 13 |
| TOTAL ABNORMAL PRODUCTS | | 38 | ERRONEOUS DETERMINATION: 5 PIECES CORRECT DETERMINATION RATE: 87% ERRONEOUS DETERMINATION RATE: 13% | |

FIG. 19

| | NUMBER OF PERFORATIONS (PIECES) | NUMBER OF PIECES (PIECES) | DETERMINATION ○ | × |
|---|---|---|---|---|
| NORMAL PRODUCT | 0 | 51 | 51 | 0 |
| ABNORMAL PRODUCT | 1 | 25 | 0 | 25 |
| | 2 | 13 | 0 | 13 |
| TOTAL ABNORMAL PRODUCTS | | 38 | ERRONEOUS DETERMINATION: 0 PIECES CORRECT DETERMINATION RATE: 100% ERRONEOUS DETERMINATION RATE: 0% | |

LASER WELDING QUALITY INSPECTION METHOD AND LASER WELDING QUALITY INSPECTION APPARATUS

BACKGROUND

1. Technical Field

The disclosure relates to a laser welding quality inspection method and a laser welding quality inspection apparatus, and more specifically, to determination of a welding abnormality during laser welding.

2. Description of the Related Art

As a laser welding quality inspection method of the related art, for example, in Japanese Patent No. 3154177, a welding defect is determined by utilizing a peak intensity of plasma light or reflection light emitted from a welded portion during laser welding. Further, in Japanese Patent Unexamined Publication No. 2007-96442, a welding defect is determined by utilizing a time integrated intensity of each of reflection light, plasma light, and infrared light from a joint portion, during laser welding.

SUMMARY

However, in a method of performing a determination of a welding defect during laser welding by a peak intensity of welding light (thermal radiation light, plasma light and laser reflection light) generated during the laser welding of the related art, or an integrated value of the intensity of those types of welding light, when there is a clear welding abnormality, it is possible to determine the welding defect, but when there is a minute welding abnormality, there is a problem that the welding defect cannot be accurately determined. The inspection method of the related art still has room for improvement in terms of more accurately detecting an occurrence of the abnormality during the laser welding.

Therefore, the disclosure is made to solve the above-described problem of the related art, and an object of the disclosure is to provide a laser welding quality inspection method and a laser welding quality inspection apparatus that can determine a welding abnormality with higher accuracy.

In order to achieve the above-mentioned object, according to an embodiment of the disclosure, a laser welding quality inspection method is a welding quality inspection method of a welded portion between a joining object and a joined object, when the joining object and the joined object are welded by being irradiated with a laser beam, the method including: acquiring first data indicating a signal intensity of thermal radiation light radiated from the welded portion during the welding; acquiring second data indicating a signal intensity of plasma light radiated from the welded portion during the welding, and determining whether or not the welded portion includes an abnormality based on a comparison between the signal intensity of the thermal radiation light and the signal intensity of the plasma light which are acquired.

According to another embodiment of the disclosure, a laser welding quality inspection apparatus is a welding quality inspection apparatus for a welded portion between a joining object and a joined object, when the joining object and the joined object are welded by being irradiated with a laser beam, the apparatus including: a measurement device and a welding state determination device. The welding state determination device includes a signal intensity acquisitor that acquires, from the measurement device, first data indicating a signal intensity of thermal radiation light, and second data indicating a signal intensity of plasma light which are radiated from the welded portion during the welding, and a signal intensity processor that executes processing of the first data and the second data acquired by the signal intensity acquisitor. The signal intensity processor determines whether or not the welded portion includes an abnormality based on a comparison between the signal intensity of the thermal radiation light and the signal intensity of the plasma light which are acquired.

As described above, according to the laser welding quality inspection method and the laser welding quality inspection apparatus according to the disclosure, by comparing the thermal radiation light and the plasma light generated during the laser welding, the welding abnormality can be determined with higher accuracy.

BRIEF DESCRIPTION OF THE DRAWINGS

FIG. 8 is a table illustrating a verification result of a welding state determination according to the related art;

FIG. 19 is a table illustrating a verification result of a welding state determination according to the exemplary embodiment of the disclosure.

DETAILED DESCRIPTIONS

Figure 1:
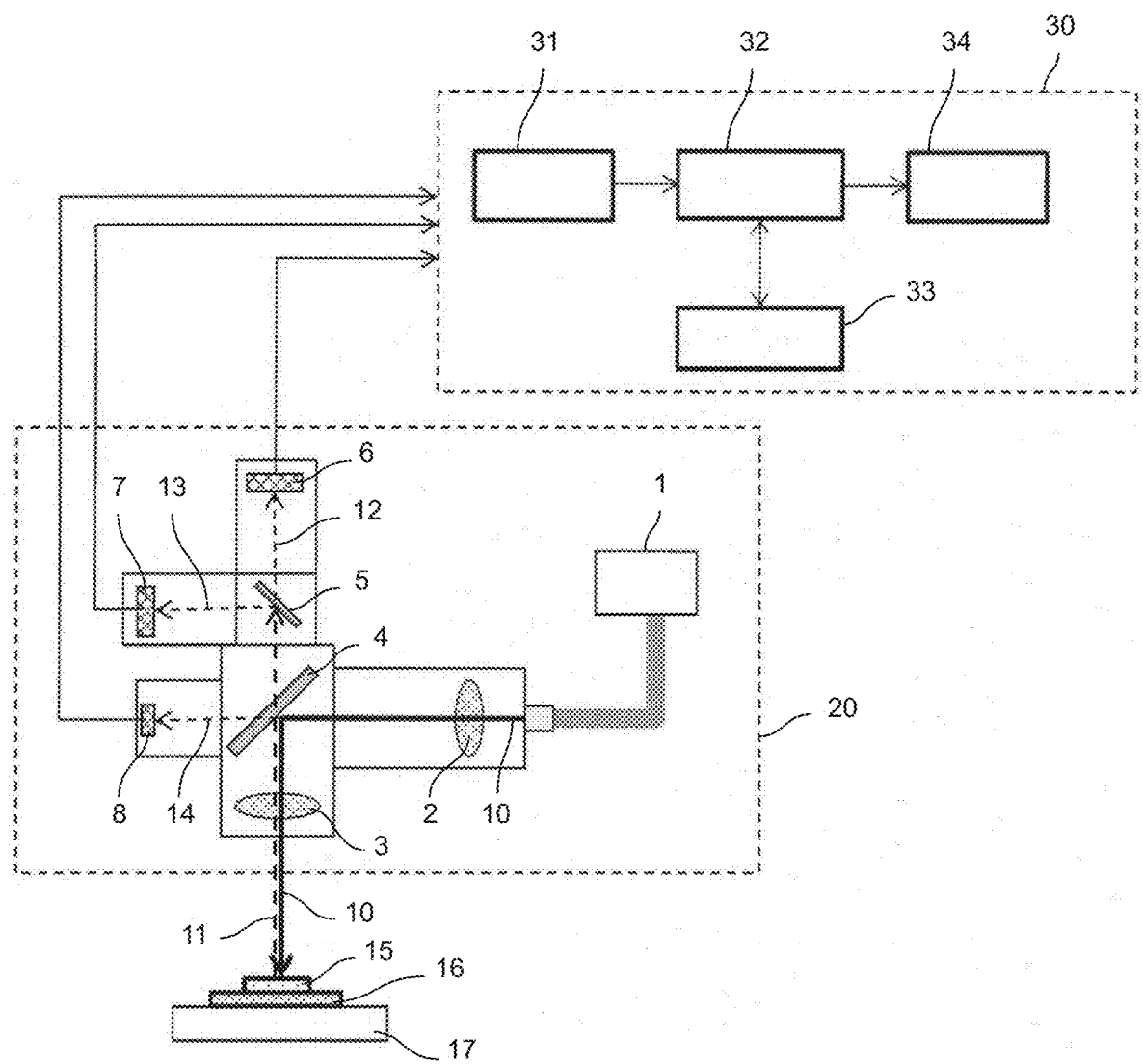
FIG. 1 is an overall view illustrating a configuration of a laser welding quality inspection apparatus according to an exemplary embodiment of the disclosure.

According to a first aspect of the disclosure, there is provided a welding quality inspection method that is a laser welding quality inspection method of a welded portion between a joining object and a joined object, when the joining object and the joined object are welded by being irradiated with a laser beam, the method including: acquiring first data indicating a signal intensity of thermal radiation light radiated from the welded portion during the welding; acquiring second data indicating a signal intensity of plasma light radiated from the welded portion during the welding; and determining whether or not the welded portion includes an abnormality based on a comparison between the signal intensity of the thermal radiation light and the signal intensity of the plasma light which are acquired.

According to a second aspect of the first aspect of the disclosure, there is provided the laser welding quality inspection method, in which the determining whether or not the welded portion includes an abnormality based on a comparison between the signal intensity of the thermal radiation light and the signal intensity of the plasma light which are acquired includes calculating a difference signal indicating a difference between the signal intensity of the thermal radiation light and the signal intensity of the plasma light, and determining that the welded portion includes an abnormality when the calculated difference signal includes a peak having a signal intensity larger than a preset determination reference value.

According to a third aspect of the second aspect of the disclosure, there is provided the laser welding quality inspection method, in which the laser welding quality inspection method further includes: acquiring an irradiation output waveform indicating an intensity of irradiation light of the laser beam by measuring the irradiation light of the laser beam during the welding, in which the calculating a difference signal indicating a difference between the signal intensity of the thermal radiation light and the signal intensity of the plasma light further includes, setting, as a determination period, a period during which the intensity of the irradiation light of the laser beam is constantly maintained, based on the irradiation output waveform, and extracting the signal intensity of the thermal radiation light within the determination period and the signal intensity of the plasma light within the determination period respectively from the signal intensity of the thermal radiation light and the signal intensity of the plasma light which are acquired, and in which the calculating a difference signal indicating a difference between the signal intensity of the thermal radiation light and the signal intensity of the plasma light includes calculating a difference between an intensity of the thermal radiation light within the determination period and an intensity of the plasma light within the determination period.

According to a fourth aspect of the third aspect of the disclosure, there is provided the laser welding quality inspection method, in which the calculating a difference signal indicating a difference between the signal intensity of the thermal radiation light within the determination period and the signal intensity of the plasma light within the determination period includes, calculating a normalization signal of the thermal radiation light and a normalization signal of the plasma light by respectively normalizing the signal intensity of the thermal radiation light within the determination period and the signal intensity of the plasma light within the determination period, and calculating a difference signal indicating a difference between the normalization signal of the thermal radiation light and the normalization signal of the plasma light.

According to a fifth aspect of the fourth aspect of the disclosure, there is provided the laser welding quality inspection method, in which in the calculating a normalization signal of the thermal radiation light and a normalization signal of the plasma light, an average value $m_{av}$ of the signal intensity of the thermal radiation light within the determination period, an average value $n_{av}$ of the signal intensity of the plasma light within the determination period, a time function $H(t)$ of the signal intensity of the thermal radiation light before being normalized within the determination period, a time function $S(t)$ of the signal intensity of the plasma light before being normalized within the determination period, a time function $Hm(t)$ of the normalization signal of the thermal radiation light within the determination period, and a time function $Sn(t)$ of the normalization signal of the plasma light within the determination period respectively satisfy the following expressions.

$$Hm(t)=(H(t)-m_{av})/m_{av} \quad \text{[Equation 1]}$$

$$Sn(t)=(S(t)-n_{av})/n_{av} \quad \text{[Equation 2]}$$

According to a sixth aspect of the fourth aspect of the disclosure, there is provided the laser welding quality inspection method, in which in the calculating a normalization signal of the thermal radiation light and a normalization signal of the plasma light, an average value $m_{av}(t)$ of a time function of the signal intensity of the thermal radiation light of a plurality of times of welding determined to have no abnormality in the welded portion within the determination period, an average value $n_{av}(t)$ of a time function of the signal intensity of the plasma light of the plurality of times of welding within the determination period, a time function $H(t)$ of the signal intensity of the thermal radiation light before being normalized within the determination period, a time function $S(t)$ of the signal intensity of the plasma light before being normalized within the determination period, a time function $Hm(t)$ of the normalization signal of the thermal radiation light within the determination period, and a time function $Sn(t)$ of the normalization signal of the plasma light within the determination period respectively satisfy the following expressions.

$$Hm(t)=(H(t)-m_{av}(t))/m_{av}(t) \quad \text{[Equation 3]}$$

$$Sn(t)=(S(t)-n_{av}(t))/n_{av}(t) \quad \text{[Equation 4]}$$

According to a seventh aspect of the disclosure, there is provided a laser welding quality inspection apparatus for a welded portion between a joining object and a joined object, when the joining object and the joined object are welded by being irradiated with a laser beam, the apparatus including: a measurement device and a welding state determination device, in which the welding state determination device includes a signal intensity acquisitor that acquires, from the measurement device, first data indicating a signal intensity of thermal radiation light radiated from the welded portion during welding, and second data indicating a signal intensity of plasma light radiated from the welded portion during the welding, and a signal intensity processor that executes processing of the first data and the second data acquired by the signal intensity acquisitor, and in which the signal intensity processor determines whether or not the welded portion includes an abnormality based on a comparison between the signal intensity of the thermal radiation light and the signal intensity of the plasma light which are acquired.

According to an eighth aspect of the seventh aspect of the disclosure, there is provided the laser welding quality inspection apparatus, in which the signal intensity processor calculates a difference signal indicating a difference between the signal intensity of the thermal radiation light and the signal intensity of the plasma light based on the first data and the second data, and determines that the welded portion includes an abnormality when the calculated difference signal includes a peak having a signal intensity larger than a preset determination reference value.

According to a ninth aspect of the eighth aspect of the disclosure, there is provided the laser welding quality inspection apparatus, in which the signal intensity acquisitor further acquires an irradiation output waveform indicating an intensity of irradiation light of the laser beam from the measurement device, in which the signal intensity processor sets, as a determination period, a period during which the intensity of the irradiation light of the laser beam is constantly maintained based on the irradiation output waveform, and extracts the signal intensity of the thermal radiation light within the determination period and the signal intensity of the plasma light within the determination period respectively from the signal intensity of the thermal radiation light and the signal intensity of the plasma light, and in which the difference signal indicates a difference between the signal intensity of the thermal radiation light within the determination period and the signal intensity of the plasma light within the determination period.

According to a tenth aspect of the ninth aspect of the disclosure, there is provided the laser welding quality inspection apparatus, in which the signal intensity processor calculates a normalization signal of the thermal radiation light and a normalization signal of the plasma light by respectively normalizing the signal intensity of the thermal radiation light within the determination period and the signal intensity of the plasma light within the determination period, and in which the difference signal indicates a difference between the normalization signal of the thermal radiation light and the normalization signal of the plasma light.

According to an eleventh aspect of the first aspect of the disclosure, there is provided the laser welding quality inspection method, in which the signal intensity of the thermal radiation light includes a first thermal radiation light intensity indicating an intensity of the thermal radiation light at a first time point during the welding, and a second thermal radiation light intensity indicating an intensity of the thermal radiation light at a second time point different from the first time point during the welding, in which the signal intensity of the plasma light includes a first plasma light intensity indicating an intensity of the plasma light at the first time point and a second plasma light intensity indicating an intensity of the plasma light at the second time point, and in which the comparison between the signal intensity of the thermal radiation light and the signal intensity of the plasma light includes calculating a first difference value indicating a difference between the first thermal radiation light intensity and the first plasma light intensity, and a second difference value indicating a difference between the second thermal radiation light intensity and the second plasma light intensity, and generating a difference signal including the first difference value and the second difference value.

According to a twelfth aspect of the disclosure, there is provided a laser welding quality inspection apparatus including: a processor; and a memory storing a program, in which when the program is executed, the processor performs, acquiring, from a first sensor, first data indicating a signal intensity of thermal radiation light radiated from a workpiece that has received a laser beam during laser welding, acquiring, from a second sensor, second data indicating a signal intensity of plasma light radiated from the workpiece during the laser welding, and determining whether or not a welded portion of the workpiece includes an abnormality based on a comparison between the signal intensity of the thermal radiation light and the signal intensity of the plasma light.

Hereinafter, exemplary embodiments of the disclosure will be described with reference to the drawings. The disclosure is not limited to the exemplary embodiments below. Appropriate changes can be made without departing from the scope of the effect of the disclosure. Combinations with other exemplary embodiments are possible.

Each drawing is a schematic view and is not necessarily strictly illustrated.

In each drawing, the substantially same configurations are denoted by the same reference numerals, and overlapping description will be omitted or simplified.

<<Exemplary Embodiments>>

First, an overall configuration of the laser welding quality inspection apparatus according to the exemplary embodiment of the disclosure will be described.

FIG. 1 is an overall view illustrating a configuration of the laser welding quality inspection apparatus according to an exemplary embodiment of the disclosure.

Laser welding quality inspection apparatus 100 illustrated in FIG. 1 includes measurement device 20 and welding state determination device 30. Measurement device 20 includes laser oscillator 1, collimator lens 2, condenser lens 3, total reflection mirror 4, dichroic mirror 5, and light receiving sensors 6, 7, and 8. Laser beam 10 emitted from laser oscillator 1 becomes a parallel beam through collimator lens 2, is reflected by total reflection mirror 4, and is condensed by condenser lens 3, and joined object 15 is irradiated with laser beam 10. Joining object 16 is installed below joined object 15. Joined object 15 and joining object 16 are fixed on stage 17, moved by stage 17, and irradiated with laser beam 10 to be laser-welded.

During the laser welding, welding light 11 generated from joined object 15 passes through condenser lens 3 and total reflection mirror 4, and is wavelength-separated by dichroic mirror 5. The wavelength-separated welding light is split into, for example, thermal radiation light (for example, wavelength 1300 nm) 12 and plasma light (for example, wavelength 400 to 700 nm) 13 by a bandpass filter (not illustrated), and each of them is incident on each of light receiving sensors 6 and 7.

On the other hand, laser beam 10 is not completely reflected by total reflection mirror 4, and light of approximately 0.5% of a laser output is transmitted through total reflection mirror 4, and transmitted laser beam 14 is incident on light receiving sensor 8.

Three types of optical signals incident on light receiving sensors 6, 7, and 8 are transmitted to welding state determination device 30 and subjected to a signal process. Welding state determination device 30 determines whether or not the welded portion between joined object 15 and joining object 16 includes an abnormality based on a result of the signal process, and performs a quality inspection of the laser welding. In FIG. 1, laser beam 10 and welding light 11 are separately illustrated between total reflection mirror 4 and joined object 15, but in reality, laser beam 10 and welding light 11 pass through condenser lens 3 along a same path.

Figure 2A:
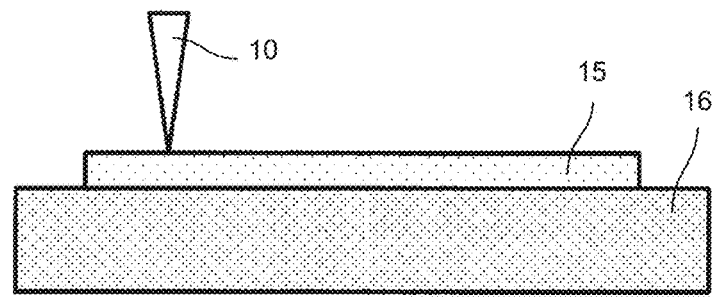
FIG. 2A is a schematic view illustrating a welding state during normal welding according to the exemplary embodiment of the disclosure, and is a sectional view of a welded portion at a time of a start of welding.

A welding state during normal welding according to the exemplary embodiment of the disclosure will be described with reference to schematic views illustrated in FIGS. 2A and 2B. FIG. 2A is a sectional view of the welded portion at a time of a start of the laser welding, and FIG. 2B is a sectional view of a welding state at a time of a completion of the welding.

First, laser beam 10 condensed by condenser lens 3 is irradiated to joined object 15 placed on joining object 16 (FIG. 2A). In the present exemplary embodiment, for example, joining object 16 is an aluminum material having a thickness of 0.5 min, joined object 15 is also a similar aluminum material having a thickness of 0.1 mm.

Next, after the welding is started, laser beam 10 is moved (from left to right as indicated by arrow P in FIG. 2B), on a straight line, relative to joined object 15 by movement (from right to left, not illustrated) of stage 17 supporting joining object 16 and joined object 15.

Figure 2B:
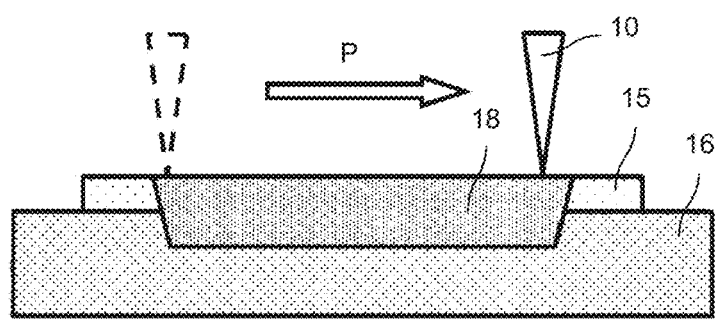
FIG. 2B is a schematic view illustrating a welding state during normal welding according to the exemplary embodiment of the disclosure, and is a sectional view of a welding state at a time of completion of welding.

As illustrated in FIG. 2B, when the welding is completed, melted and solidified portion 18 having a constant depth is formed in a scanning region of laser beam 10. For example, a laser output at this time is 250 W, a moving speed of stage 17 is 500 mm/s, and the depth of melted and solidified portion 18 is approximately 200 µm.

Figure 3:
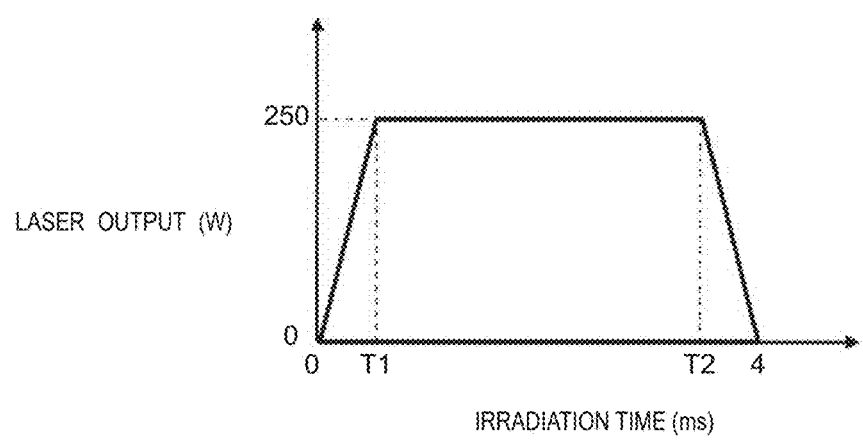
FIG. 3 is a graph illustrating setting of an output waveform of a laser beam according to the exemplary embodiment of the disclosure.

FIG. 3 illustrates setting of the output waveform of the laser beam according to the present exemplary embodiment. As illustrated in FIG. 3, the output of the laser beam is set to a trapezoidal waveform and includes slow-up portion (0 ms to T1), flat portion (T1 to T2), and slow-down portion (T2 to 4 ms), and a total irradiation time is 4 ins. The slow-up portion and the slow-down portion in the output waveform of the laser beam are provided to prevent spatter or depression during the laser welding. In the welding by irradiation with the laser beam having such a trapezoidal waveform, the shape of melted and solidified portion 18 is formed into an inverted trapezoidal shape (FIG. 2B).

Figure 4A:
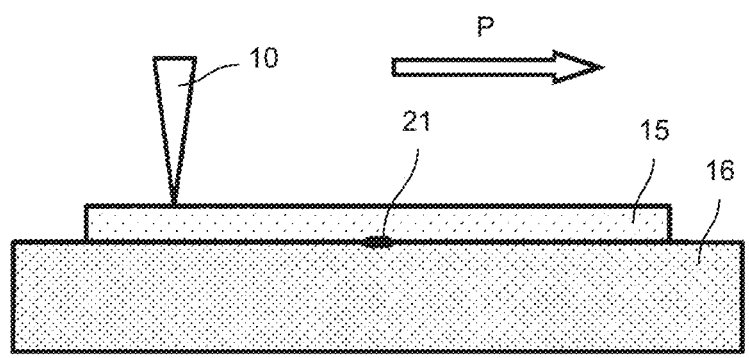
FIG. 4A is a schematic view illustrating a welding state during abnormal welding according to the exemplary embodiment of the disclosure, and is a sectional view of a welded portion at a time of a start of welding.
Figure 4B:
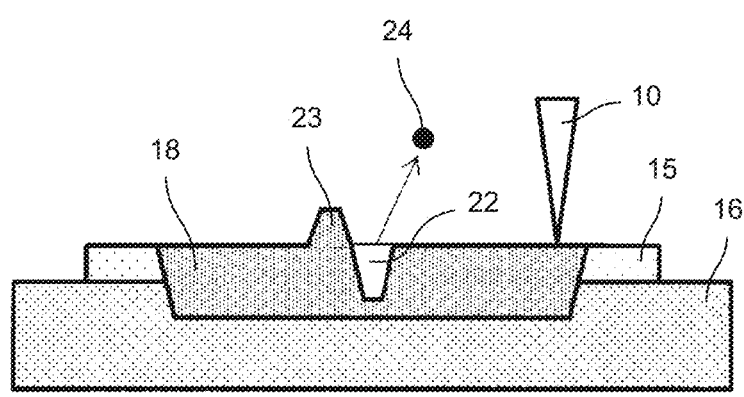
FIG. 4B is a schematic view illustrating a welding state during abnormal welding according to the exemplary embodiment of the disclosure, and is a sectional view of a welding state at a time of completion of welding.

Next, the welding state during abnormal welding according to the exemplary embodiment of the disclosure will be described by using schematic views illustrated in FIGS. 4A and 4B. FIG. 4A is a sectional view of a welded portion at a time of a start of the laser welding, and FIG. 4B is a sectional view of a welding state at a time of a completion of the welding.

In the laser welding, especially when a thin plate having a thickness of 0.1 mm is welded, an occurrence of perforation or spatter due to a foreign matter sandwiched at a joining interface between the joining object and the joined object occupies a majority of abnormal welding cases. Therefore, the welding state when the foreign matter is sandwiched at the joining interface is schematically illustrated in FIGS. 4A and 4B.

As illustrated in FIG. 4A, at the time of the start of the welding, joined object 15 placed on joining object 16 is irradiated with laser beam 10. At this time, for example, resin foreign matter 21 is sandwiched at the joining interface between joining object 16 and joined object 15.

Next, after the start of the welding, laser beam 10 is moved (from left to right as indicated by arrow P in FIG. 4A) on a straight line relative to joined object 15 by the movement (from right to left, not illustrated) of stage 17 supporting joining object 16 and joined object 15. When the laser welding progresses with the movement of laser beam 10 and laser beam 10 hits resin foreign matter 21, resin foreign matter 21 is rapidly sublimated by the irradiation with laser beam 10. Therefore, in melted and solidified portion 18, the molten material (aluminum) around resin foreign matter 21 is blown off, so that any one or a plurality of perforations 22, abnormal projections 23, and spatters 24 are generated (see FIG. 4B).

When perforation 22 occurs, the joining intensity decreases, when abnormal projection 23 occurs, the external appearance becomes poor, and when spatter 24 occurs, the foreign matter is mixed into an inside of the product. Therefore, the abnormality occurred in the welded portion causes various product defects. Therefore, it is necessary to detect such welding abnormalities in real time and eliminate defective welded products.

Next, a difference in welding light generated during normal welding and abnormal welding according to the present exemplary embodiment will be described below.

First, a state during the normal welding will be described.

Figure 5A:
FIG. 5A is a view illustrating an external appearance of a melted and solidified portion during normal welding according to an exemplary embodiment of the disclosure.
Figure 5B:
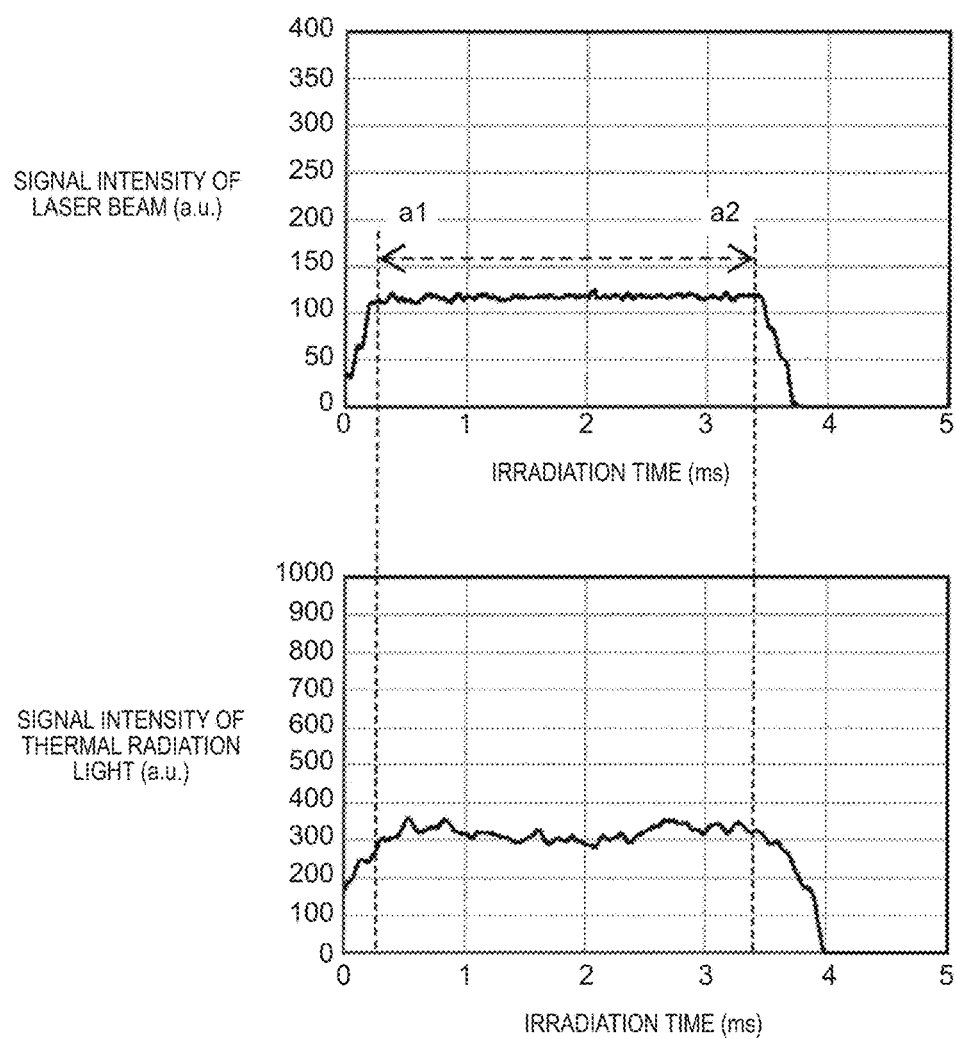
FIG. 5B is graphs illustrating an irradiation output waveform of a laser beam and a signal intensity of thermal radiation light during normal welding according to the exemplary embodiment of the disclosure.

FIG. 5A illustrates the external appearance of melted and solidified portion 18 during the normal welding according to the present exemplary embodiment. An upper part of FIG. 5B illustrates an irradiation waveform of the laser beam obtained by light receiving sensor 8, in which a horizontal axis represents an irradiation time and a vertical axis represents a signal intensity. A lower part of FIG. 5B illustrates the signal intensity of the thermal radiation light obtained by light receiving sensor 6, in which a horizontal axis represents an irradiation time and a vertical axis represents a signal intensity of the thermal radiation light. The signal intensity represented on these vertical axes is proportional to intensity (W) of the light incident on each of light receiving sensors 8 and 6, and is expressed by using any unit (a.u.=arbitrary unit). The output waveform of the laser beam is set in the trapezoidal shape as illustrated in FIG. 3.

When the output waveform of the trapezoidal laser beam is set, the output waveform of the laser beam with which joining object 16 and joined object 15 are actually irradiated also has a substantially trapezoidal shape as illustrated in FIG. 5B.

In other words, the irradiation waveform of the laser beam has a shape according to the setting of the output waveform of the laser beam, and has a flat portion in irradiation period a1 to a2 so as to correspond to flat portion (T1 to T2, FIG. 3) in an output design of the trapezoidal laser beam.

Since the thermal radiation light generated during the welding basically has a signal intensity corresponding to the irradiation output of the laser beam, as illustrated in FIG. 5B, it becomes a substantially trapezoidal shape having the flat portion in the irradiation period a1 to a2.

During the normal welding, for example, an external shape of melted and solidified portion 18 illustrated in FIG. 5A has a melting length of approximately 2 mm and a melting width of approximately 0.2 mm.

Next, a state during the abnormal welding will be described.

Figure 6A:
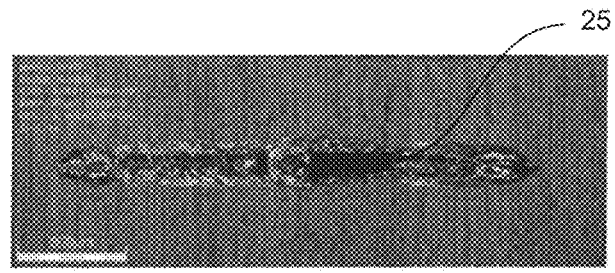
FIG. 6A is a view illustrating an external appearance of a melted and solidified portion during abnormal welding according to an exemplary embodiment of the disclosure.
Figure 6B:
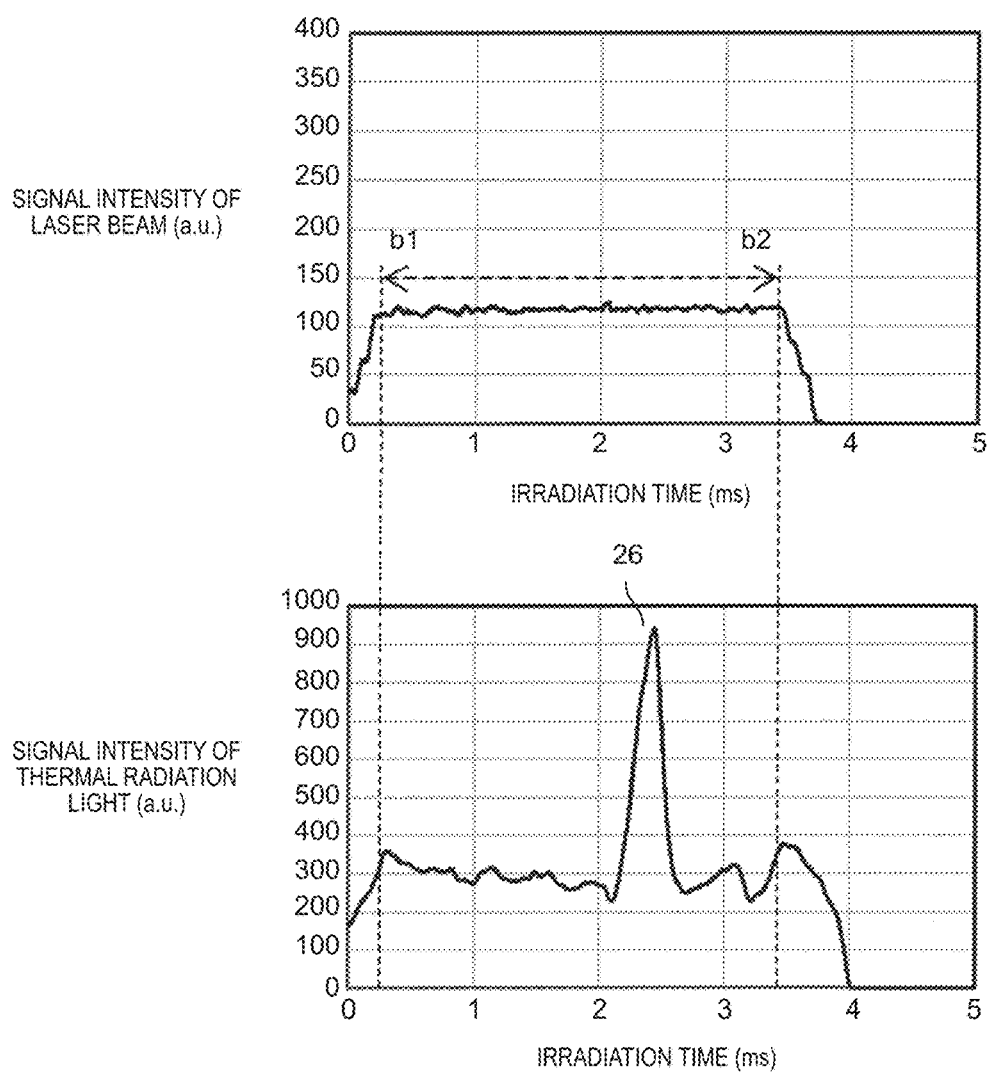
FIG. 6B is graphs illustrating an irradiation output waveform of a laser beam and a signal intensity of thermal radiation light during abnormal welding according to the exemplary embodiment of the disclosure.

FIG. 6A illustrates an external appearance of melted and solidified portion 18 during the abnormal welding according to the present exemplary embodiment. During the abnormal welding, perforation 25 is seen in a central portion of melted and solidified portion 18. During the welding, it is considered that at this location, the resin foreign matter at the joining interface is rapidly sublimated by the irradiation of the laser beam, and a molten material is blown off, whereby perforation 25 is formed. The signal intensity of the thermal radiation light obtained at this time is illustrated in a lower part of FIG. 6B. As clearly illustrated by a lower graph of FIG. 6B, abnormal peak 26 appears in the signal intensity of the thermal radiation light when the abnormal welding occurs.

Abnormal peak 26 is specifically a peak having a very large signal intensity. This is due to abnormal heat generation of the resin foreign matter, blowout of the molten material, and the like.

That is, during the normal welding, the signal intensity of the thermal radiation light in irradiation period a1 to a2 corresponding to the flat portion of the irradiation output waveform of the laser beam illustrated in the upper part of FIG. 5B has a relatively uniform distribution without having the abnormal peak as illustrated in the lower part of FIG. 5B. On the other hand, during the abnormal welding, in the signal intensity of the thermal radiation light in irradiation period b1 to b2 corresponding to the flat portion of the irradiation output waveform of the laser beam illustrated in the upper part of FIG. 6B, abnormal peak 26 appears corresponding to the time of occurrence of the abnormal welding as illustrated in the lower part of FIG. 6B. In the welding defect determination of the related art, for example, determination of the welding defect is performed by determining whether or not a peak having a signal intensity exceeding a certain determination reference value is included in the detected signal intensity of the thermal radiation light based on presence or absence of this abnormal peak.

The accuracy of the welding abnormality determination based on the peak intensity of thermal radiation light according to the related art was verified as follows.

<<Verification of Welding State Determination by Related Art>>

Figure 7A:
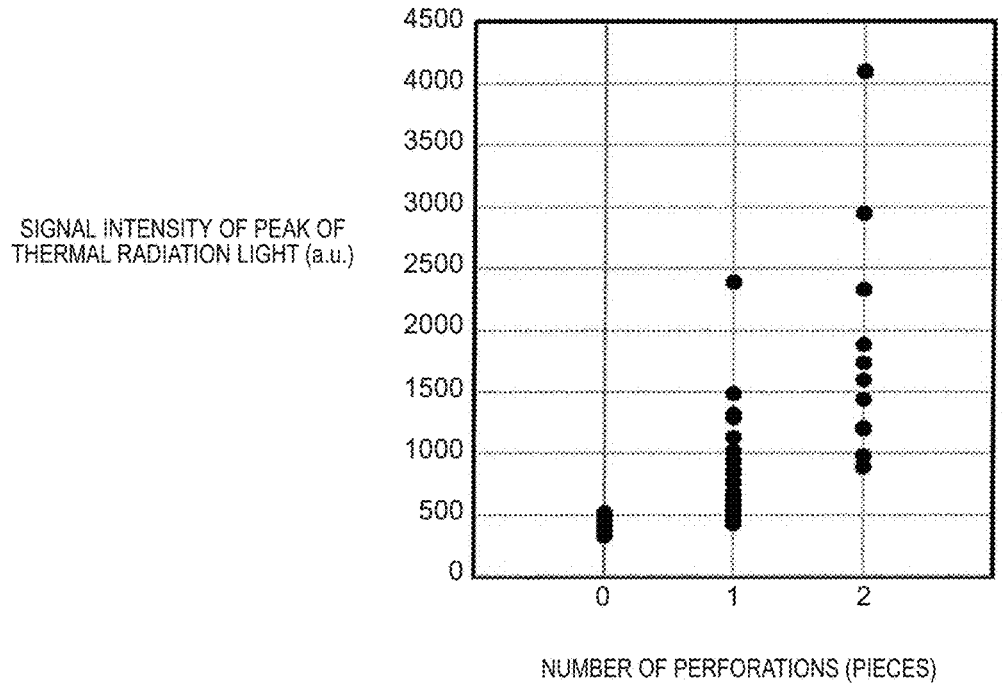
FIG. 7A is a diagram illustrating thermal radiation light during welding of a welded product having a plurality of different welding states in a welding defect determination of the related art, and is a graph illustrating signal intensities of peaks in thermal radiation light of a plurality of welded products.
Figure 7B:
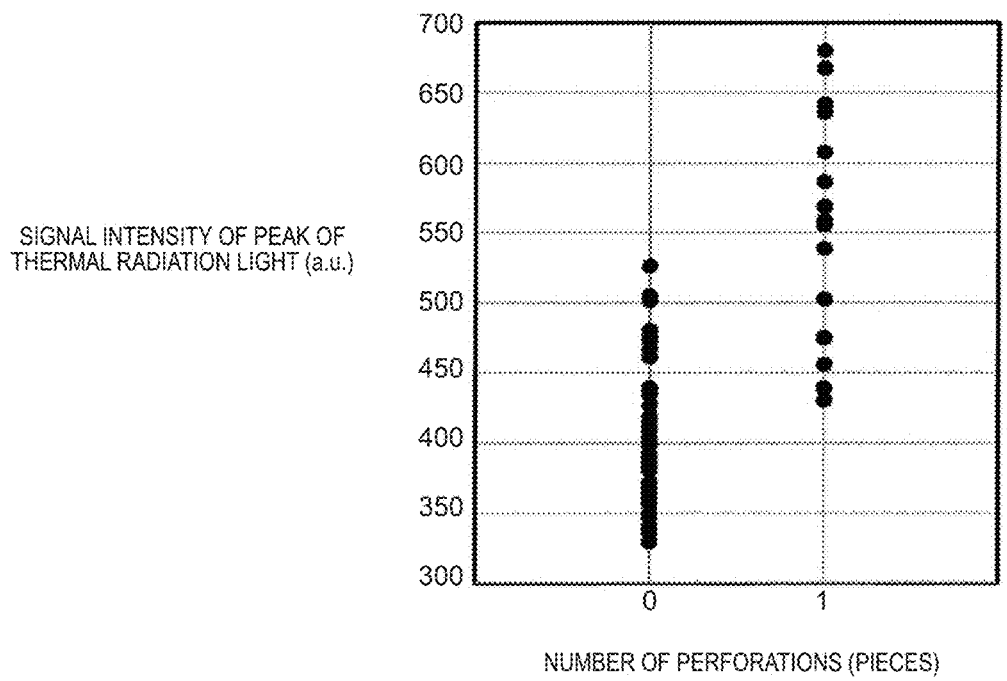
FIG. 7B is a diagram illustrating the thermal radiation light during welding of a welded product having a plurality of different welding states in the welding defect determination of the related art, and is an enlarged graph illustrating a portion where peaks of the signal intensities are equal to or less than 700 in the thermal radiation light of a plurality of welded products.

Verification of the welding state determination by the related art was performed by using a total of 89 welded products, 51 normal welded products, and 38 abnormal welded products. Here, the normal welded product is, specifically, a welded product in which no foreign matter is mixed in the joining interface, and the abnormal welded product is, specifically, a welded product in which the foreign matter is mixed in the joining interface. FIG. 7A and FIG. 7B illustrate the thermal radiation light during welding of welded products having a plurality of different welding states in the welding defect determination of the related art. FIG. 7A illustrates signal intensities of peaks in the thermal radiation light of a plurality of welded products. A horizontal axis represents the number of perforations generated in the melted and solidified portion, and a vertical axis represents the signal intensity of the peak in the thermal radiation light. Even if one perforation is formed, the welding is defective, and if two perforations are formed, the state of the welding defect is further deteriorated. In order to more clearly illustrate the determination of normality/abnormality, FIG. 7B is an enlarged view of a portion where the signal intensities of the peaks in the thermal radiation light of the plurality of welded products illustrated in FIG. 7A are equal to or less than 700. In this case, as illustrated in FIG. 7B, the signal intensities of the thermal radiation light generated during the welding of the welded products having 0 or 1 perforation are illustrated.

As illustrated in FIGS. 7A and 7B, the signal intensities of the thermal radiation light generated during the welding of the normal welded products are approximately 320 to 530, whereas the signal intensities of the thermal radiation light generated during the welding of the abnormal welded products having one perforation are approximately 430 to 2400, and the signal intensities of the thermal radiation light generated during the welding of the abnormal welded products having two perforations are approximately 900 to 4100.

In this case, for example, in a case where 530, which is a maximum value of the signal intensity of the thermal radiation light generated during the welding of the normal welded product, is used as a determination reference value of the welding defect, all of the abnormal welded products, in which two perforations are formed, can be determined as the welding abnormalities. However, all the abnormal welded products having one perforation are not determined as the welding abnormalities, and erroneous determinations occur. Specifically, among the abnormal welded products having one perforation, in five abnormal welded products in which the signal intensity of the thermal radiation light is approximately 430 to 500, if the determination is performed based on the above-described determination reference value, the presence of the abnormal peak is not determined, and the welding is determined as normal. That is, in a determination result of the welding defect of the related art illustrated in FIG. 8, among a total of 38 abnormal welded products, 5 erroneous determinations occur, a correct determination rate is 87%, and an erroneous determination rate is 13%.

On the other hand, if it is attempted to determine 5 abnormal welded products as welding abnormalities, it is necessary to set a determination threshold to equal to or less than 430. In this case, a large number of normal welded products are determined as welding abnormalities, thereby resulting in the erroneous determination (see FIG. 7B).

As described above, in the welding defect determination method of the related art, it is necessary to improve the accuracy of the welding defect determination. Therefore, the present inventors analyzed the cause of the erroneous determination in the welding defect determination of the related art as follows.

Figure 9A:
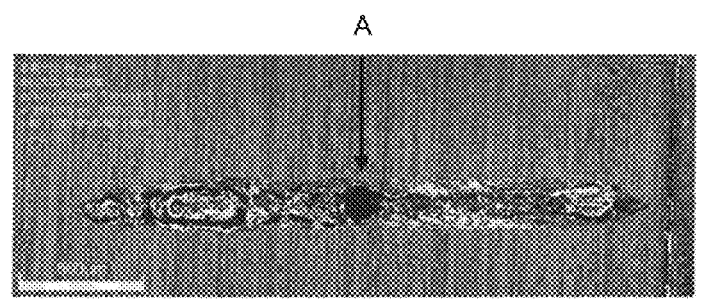
FIG. 9A is a view illustrating an external appearance of a melted and solidified portion of an abnormal welded product in the welding defect determination of the related art.
Figure 9B:
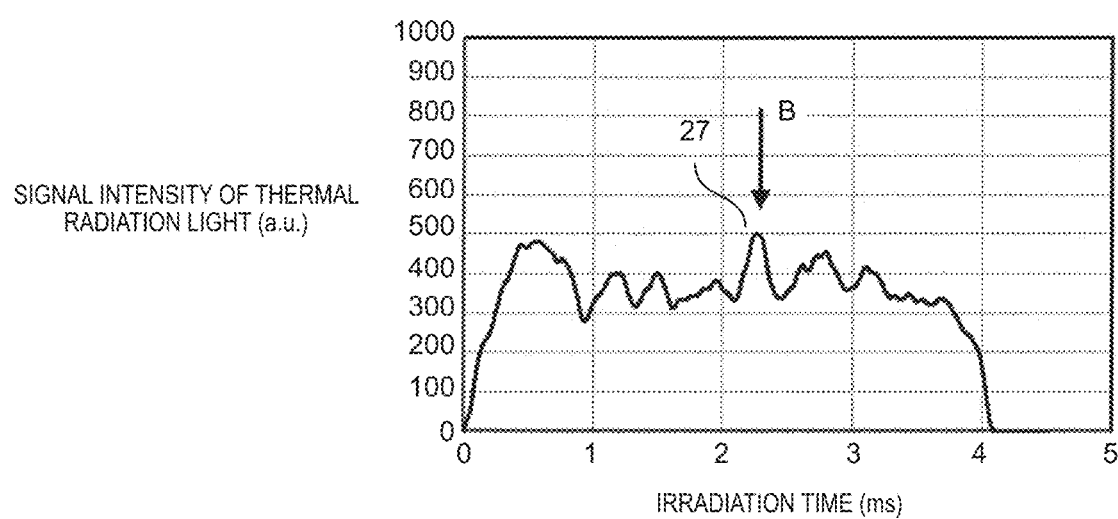
FIG. 9B is a graph illustrating a signal intensity of thermal radiation light during welding of an abnormal welded product in the welding defect determination of the related art.

FIG. 9A illustrates an external appearance of the melted and solidified portion of the abnormal welded product in the welding defect determination of the related art. FIG. 9B illustrates the signal intensity of the thermal radiation light during the welding of the abnormal welded product in the welding defect determination of the related art. As illustrated in FIG. 9A, a minute perforation is generated in a central portion of the melted and solidified portion as indicated by arrow A. Correspondingly, in the signal intensity of the thermal radiation light during the welding illustrated in FIG. 9B, small peak 27 appears corresponding to the occurrence of abnormal melting illustrated by arrow B. The signal intensity of the thermal radiation light illustrated in peak 27 is approximately 500.

Figure 10A:
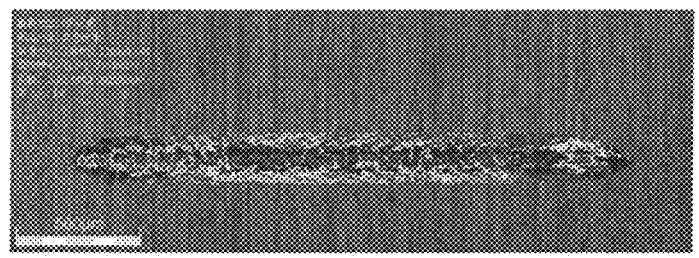
FIG. 10A is a view illustrating an external appearance of a melted and solidified portion of a normal welded product in the welding defect determination of the related art.
Figure 10B:
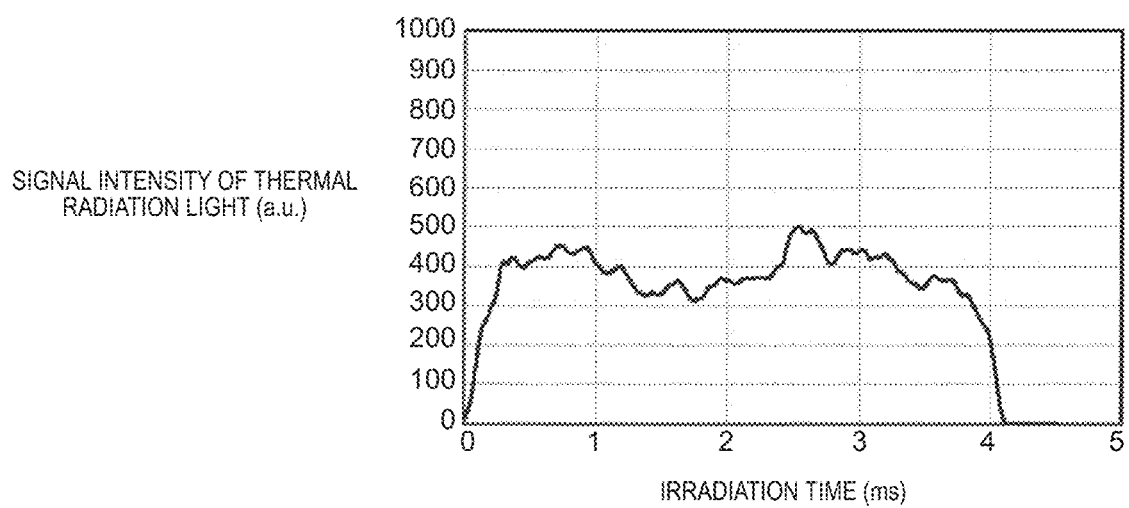
FIG. 10B is a graph illustrating a signal intensity of thermal radiation light during welding of a normal welded product in the welding defect determination of the related art.

FIG. 10A illustrates the external appearance of the melted and solidified portion of the normal welded product in the welding defect determination of the related art. FIG. 10B is a graph illustrating the signal intensity of the thermal radiation light during the welding of the normal welded product in the welding defect determination of the related art. As illustrated in FIG. 10B, in the normal welded product, the signal intensity of the thermal radiation light generated during the welding fluctuates within a range of approximately 300 to 500. That is, in the signal intensity of the thermal radiation light measured for the abnormal welded product illustrated in FIG. 9B, the signal intensity of peak 27 by the occurrence of the abnormal welding is within the fluctuation range of the signal intensity of the thermal radiation light measured for the normal welded product illustrated in FIG. 10B.

From the above analysis, it is clear that in the laser welding, a behavior of the signal intensity of thermal radiation light by the minute welding abnormalities in some abnormal welded products cannot be distinguished from the fluctuation of the signal intensity of the thermal radiation light in the normal welded products. Such a phenomenon occurs because, in a case where an influence of the minute welding abnormality on the thermal radiation light is small, the influence is buried in the fluctuation of the welding light generated during the welding. Therefore, as illustrated in FIGS. 7A and 7B, the measured signal intensities of the peaks in the thermal radiation light during the welding are overlapped with each other between the normal welded product and the abnormal welded product. As a result, as described above, an appropriate determination reference value cannot be set, thereby resulting in an erroneous determination. Therefore, the welding defect determination by the peak intensity of the thermal radiation light of the related art has a problem that the minute welding abnormality cannot be accurately determined.

Therefore, the present inventors obtained the following new findings as a result of repeated studies in order to detect, with higher accuracy, the occurrence of the welding abnormality in the laser welding.

Figure 11:
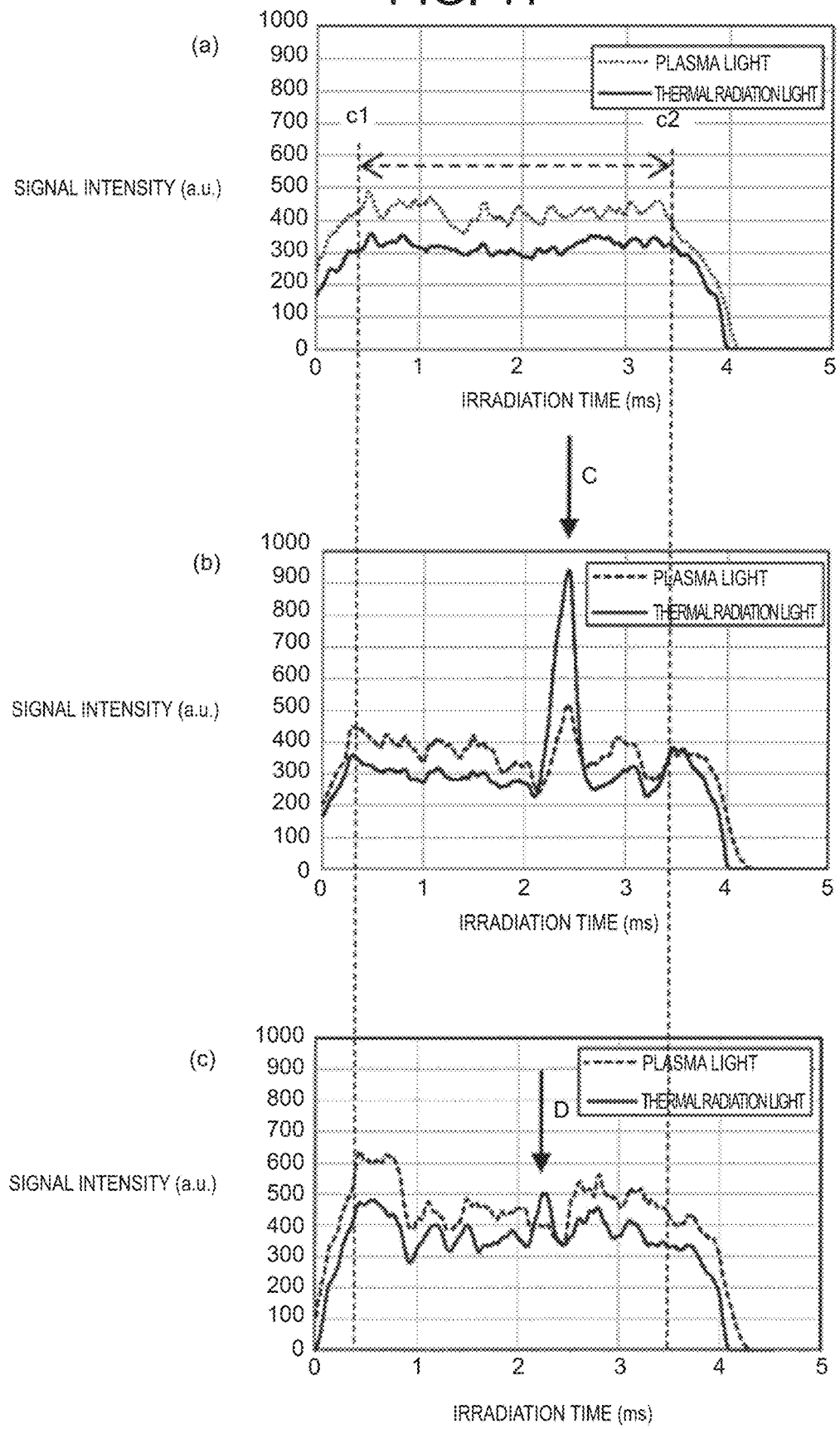
FIG. 11 is a signal intensity of thermal radiation light and a signal intensity of plasma light during welding according to the exemplary embodiment of the disclosure, and is a graph illustrating measurement results of (a) a normal welded product, (b) abnormal welded product 1 that is determined as a welding abnormality in the method of the related art, and (c) abnormal welded product 2 that is not determined as a welding abnormality in the method of the related art.

The present inventors also measured the plasma light generated during the welding at the same time as the measurement of the thermal radiation light, and paid attention to a change in the signal intensities of both. FIG. 11 illustrates the measurement results of the signal intensity of the thermal radiation light and the signal intensity of the plasma light generated during the laser welding according to the present exemplary embodiment. (a) of FIG. 11 illustrates the signal intensity (solid line) of the thermal radiation light and the signal intensity (dotted line) of the plasma light of the normal welded product. (b) of FIG. 11 illustrates the signal intensity (solid line) of the thermal radiation light and the signal intensity (dotted line) of the plasma light of abnormal welded product 1 determined as the welding abnormality in the method of the related art. (c) of FIG. 11 illustrates the signal intensity (solid line) of the thermal radiation light and the signal intensity (dotted line) of the plasma light of abnormal welded product 2 that was not determined as the welding abnormality in the method of the related art.

As illustrated in (a) of FIG. 11, during the normal welding, in irradiation period c1 to c2 of the laser beam, the thermal radiation light and the plasma light generated in the welded portion illustrate similar behaviors, and have similar signal intensities to each other.

On the other hand, in the abnormal welded product of (b) of FIG. 11, both the thermal radiation light and the plasma light have steep peaks at a time point at which the welding abnormality occurs (indicated by arrow C).

Here, what the present inventors noticed is the signal intensity of the peak generated in the thermal radiation light and the plasma light during the abnormal welding. As illustrated in (b) of FIG. 11, the signal intensity of the peak generated during the abnormal welding is much larger in the thermal radiation light than that in the plasma light. The signal intensity of the thermal radiation light changes greatly when the welding abnormality occurs by the resin foreign matter at the joining interface, because the temperature rises sharply due to the rapid sublimation of the resin foreign matter, and a peak having a large signal intensity appears. On the other hand, when the welding abnormality occurs, the plasma light does not change so much as compared with the thermal radiation light. Therefore, when the welding abnormality occurs, a difference occurs in the change in signal intensity between the thermal radiation light and the plasma light.

In abnormal welded product 2 illustrated in (c) of FIG. 11, a small peak appears in the signal intensity of the thermal radiation light at the time point (indicated by arrow D) at which the welding abnormality occurs. On the other hand, no peak appears in the signal intensity of the plasma light. This is because, as described above, the thermal radiation light is more affected by the welding abnormality than the plasma light, even if there is a minute welding abnormality, it is considered that the change in the thermal radiation light appears, but the change in the plasma light does not appear. That is, as in the case of (b) of FIG. 11, when the welding abnormality occurs, there is a difference in the change in the signal intensity between the thermal radiation light and the plasma light.

The present inventors found that the thermal radiation light and the plasma light during the normal welding exhibit similar behaviors to each other, whereas the thermal radiation light and the plasma light during the abnormal welding have a difference in the change in the signal intensity; based on this, by evaluating the difference signal between the thermal radiation light and the plasma light, the abnormal welding can be accurately determined even for the minute welding abnormality. Based on this new finding, the present inventors developed a laser welding quality inspection method and apparatus according to the disclosure.

Figure 12:
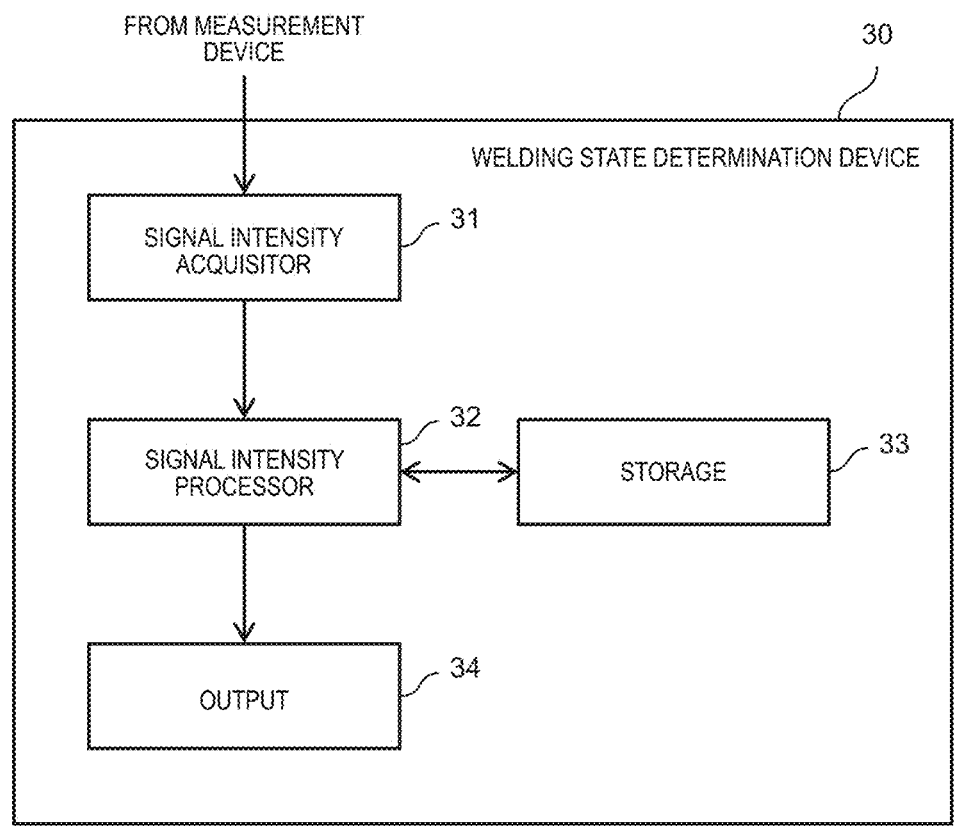
FIG. 12 is a block diagram illustrating a configuration of a welding state determination device in the laser welding quality inspection apparatus of FIG. 1.

FIG. 12 is a block diagram illustrating a configuration of welding state determination device 30 in laser welding quality inspection apparatus 100 of FIG. 1.

As illustrated in FIG. 12, welding state determination device 30 includes signal intensity acquisitor 31, signal intensity processor 32, storage 33, and output 34, and is electrically connected to measurement device 20. Signal intensity acquisitor 31 acquires, from measurement device 20, first data indicating the signal intensity of the thermal radiation light radiated from the welded portion and second data indicating the signal intensity of the plasma light during the welding. Signal intensity processor 32 determines whether or not an abnormality occurs during the welding by executing the processing of the first data and the second data acquired by signal intensity acquisitor 31. Storage 33 may be, for example, an auxiliary storage device such as a hard disk drive, and stores a data processing program executed by signal intensity processor 32, various data, and the like. Output 34 may be an output interface circuit that outputs data from welding state determination device 30 to the outside. Welding state determination device 30 may be, for example, a computer including a processor and storage 33 that stores a program. When executing the program, the processor executes a data process. Specifically, the processor acquires, from light receiving sensor 7, first data indicating the signal intensity of the thermal radiation light radiated from the workpiece that received the laser beam during the laser welding. The processor further acquires, from light receiving sensor 7, second data indicating the signal intensity of the plasma light radiated from the workpiece during the laser welding. The processor further determines whether or not the welded portion of the workpiece includes an abnormality based on a comparison between the signal intensity of the thermal radiation light and the signal intensity of the plasma light.

Welding state determination device 30 may also acquire the data processing program executed by signal intensity processor 32 from a portable storage medium. The storage medium is a medium accumulating information such as a program by an electric, magnetic, optical, mechanical, or chemical action so that the computer, another device, machine, or the like can read the information such as the recorded program.

<<Determination Process of Welding State>>

Figure 13:
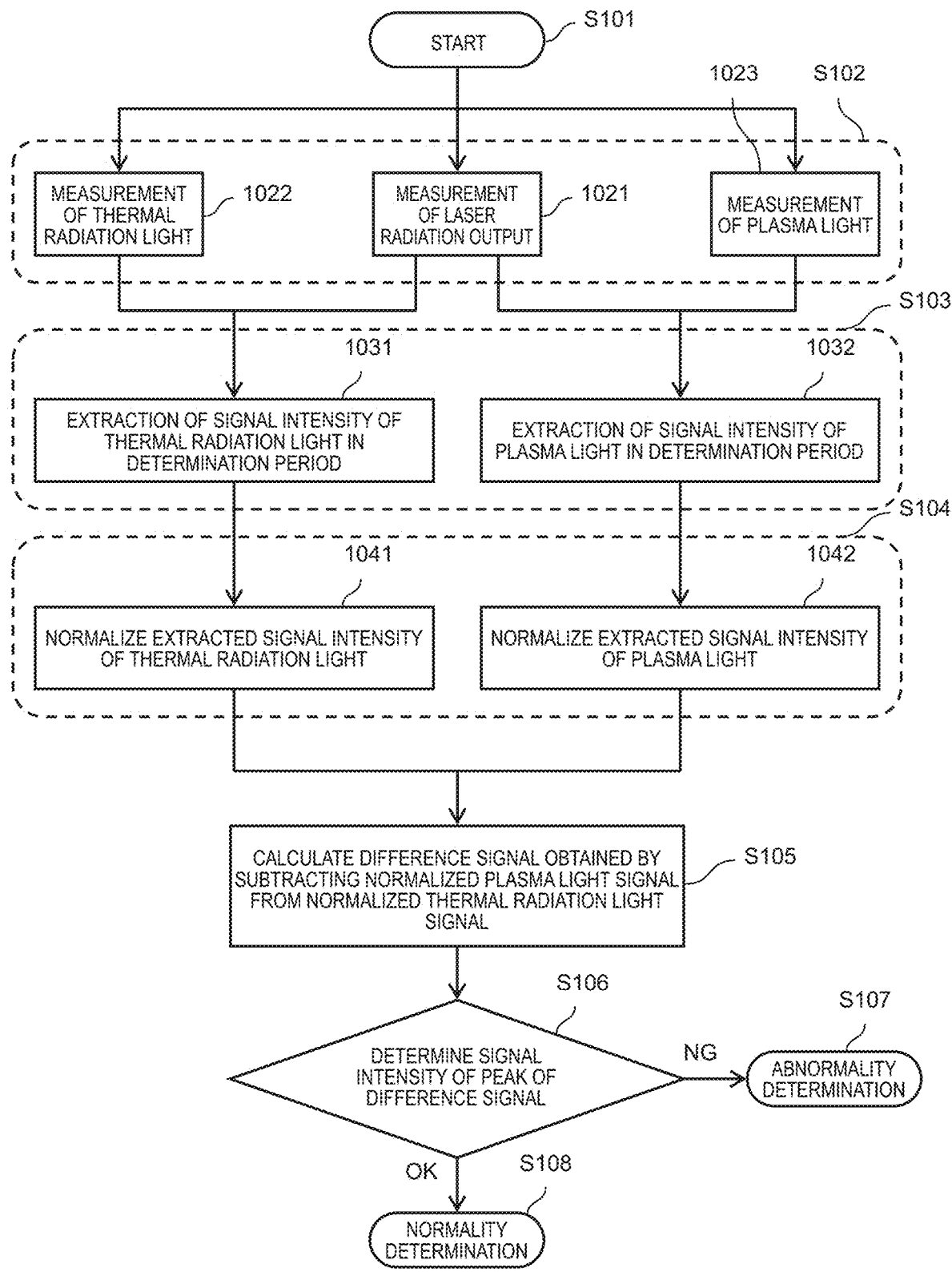
FIG. 13 is a diagram illustrating a flowchart of a determination process of the welding state of the laser welding quality inspection apparatus according to the exemplary embodiment of the disclosure.

FIG. 13 is a flowchart of a determination process of a welding state of laser welding quality inspection apparatus 100 according to the exemplary embodiment of the disclosure. The determination process of the welding state of the laser welding will be described with reference to FIG. 13.

(1) First, in step S101, laser welding is started.

(2) Next, in step S102, at the same time as the laser welding, measurement device 20 simultaneously performs irradiation output measurement of the laser beam 1021, measurement of the thermal radiation light 1022, and measurement of the plasma light 1023. Signal intensity acquisitor 31 acquires, from measurement device 20, data of the irradiation output waveform of the laser beam, the signal intensity of the thermal radiation light, and the signal intensity of the plasma light.

(3) In step S103, signal intensity processor 32 determines the determination period based on the acquired irradiation output waveform of the laser beam. Signal intensity processor 32 further extracts, from the measurement data of the thermal radiation light and the plasma light, data of the signal intensity of the thermal radiation light and data of the signal intensity of the plasma light within the determination period, respectively (1031 and 1032). A specific data extraction method will be described later.

(4) Subsequently, in step S104, signal intensity processor 32 performs signal normalization on the data of the extracted signal intensity of the thermal radiation light and the extracted signal intensity of the plasma light, respectively (1041 and 1042). A specific signal normalization method will be described later.

(5) Subsequently, in step S105, signal intensity processor 32 subtracts the normalized signal intensity of the plasma light from the normalized signal intensity of the thermal radiation light to calculate a difference signal indicating the difference between the normalized signal intensity of the thermal radiation light and the normalized signal intensity of the plasma light. A specific calculation method of the difference signal will be described later.

(6) Next, in step S106, signal intensity processor 32 determines whether or not an abnormality has occurred in the welded portion based on the signal intensity of the peak of the difference signal.

(7) Finally, in step S107 and step S108, signal intensity processor 32 determines the welding state based on the signal intensity of the peak of the difference signal. Specifically, when the calculated difference signal includes a peak having a signal intensity larger than a certain determination reference value, it is determined as welding abnormality (step S107). On the other hand, when the calculated difference signal does not include a peak having a signal intensity larger than a certain determination reference value, it is determined as normal welding (step S108).

After that, the determination result of the welding state by signal intensity processor 32 is output via output 34, and the processed product, which is determined as the welding abnormality based on the determination result, may be discharged as a defective product from the process. The processed product determined as the normal welding flows to the next step as a good product, for example. The determination reference value used for the determination may be determined by a basic experiment and is stored in storage 33. The determination reference value may be changed depending on a material of the processed product, output setting of the laser beam, or the like.

<<Data Extraction Method>>

Figure 14:
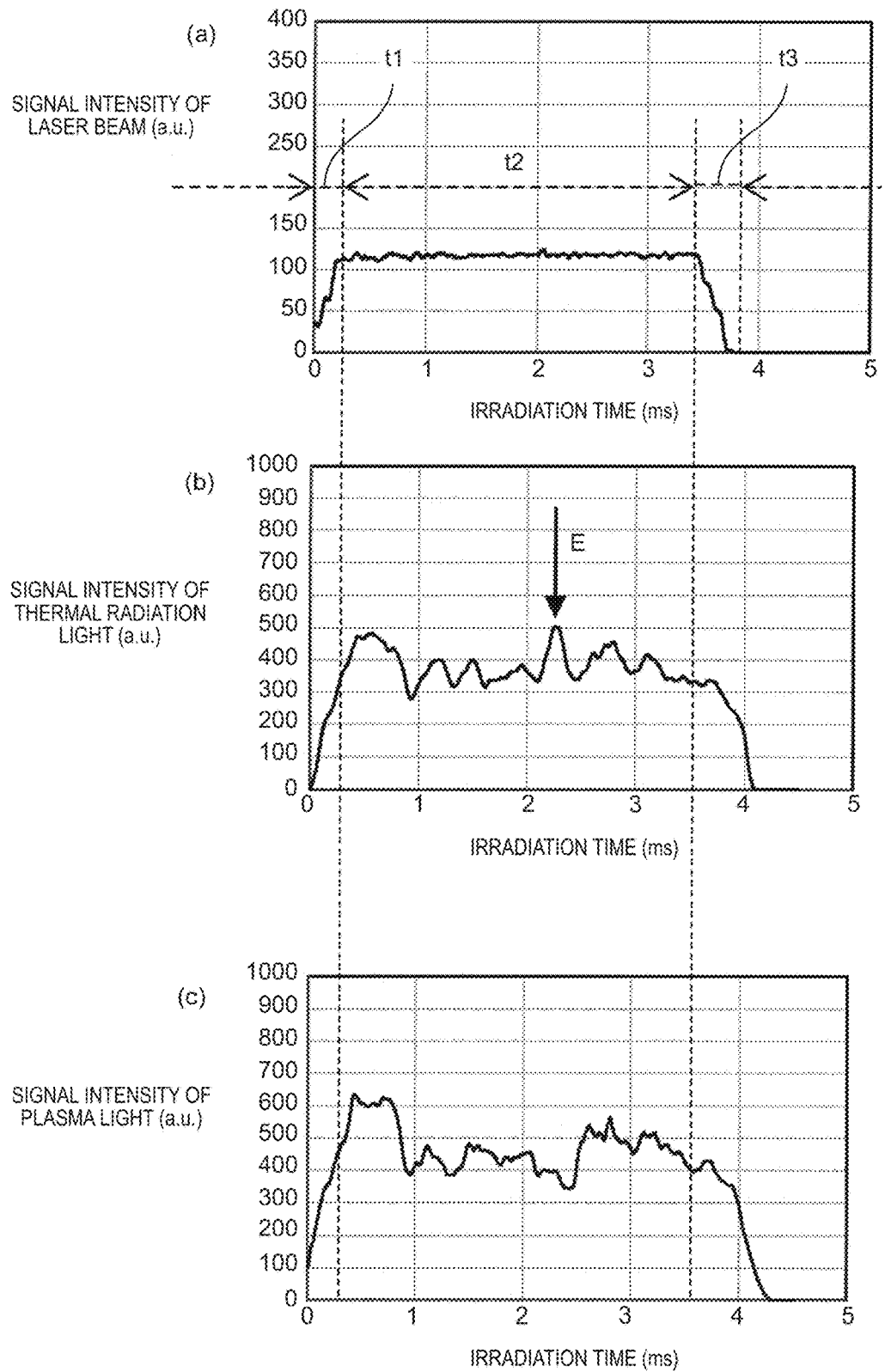
FIG. 14 is an execution result of step S102 in the determination flowchart of the welding state of FIG. 13, and is a view illustrating (a) an irradiation output waveform of a laser beam, (b) a signal intensity of thermal radiation light of a welded product having a minute welding abnormality, and (c) a signal intensity of plasma light of the welded product having a minute welding abnormality.

The data extraction step S103 of the determination process of the welding states illustrated in FIG. 13 will be described in detail with reference to FIGS. 14 and 15. FIG. 14 illustrates the execution result of step S102 in the determination flowchart of the welding state of FIG. 13. (a) of FIG. 14 illustrates the irradiation output waveform of the laser beam measured in step S102. (b) of FIG. 14 illustrates the signal intensity of the thermal radiation light of the welded product having the minute welding abnormality measured in step S102, and (c) of FIG. 14 illustrates the signal intensity of the plasma light of the welded product having the minute welding abnormality measured in step S102. At this time, as illustrated in (b) of FIG. 14, a small peak (indicated by arrow E) appears in the signal intensity of the thermal radiation light when the minute abnormal welding occurs, and since the signal intensity of the peak is within the fluctuation range of the signal intensity of the thermal radiation light during the welding, abnormal welding is not determined by the welding defect determination of the related art by the peak intensity of the thermal radiation light. The signal intensity ((c) of FIG. 14) of the plasma light during the welding fluctuates up and down, and no peak appears when minute abnormal welding occurs.

As illustrated in (a) of FIG. 14, the irradiation output waveform of the laser beam according to the present exemplary embodiment has a substantially trapezoidal shape. Slow-up portion t1 in the trapezoidal waveform is provided to prevent spatter at the time of the start of the welding, and slow-down portion t3 is provided to prevent depression at the end of the welding. Therefore, slow-up portion t1 and slow-down portion t3 are regions where the laser output is weak, and joined object 15 and joining object 16 are not welded. That is, the welding of joined object 15 and joining object 16 is carried out in flat portion t2 of the trapezoidal waveform. Therefore, in step S106 in FIG. 13, it is preferable to determine the state of the welded portion by using the difference signal between the thermal radiation light and the plasma light corresponding to only flat portion t2 in the irradiation output waveform of the trapezoidal laser beam. Therefore, in step S103, the irradiation period corresponding to flat portion t2 of the trapezoidal waveform of the laser beam having a constant irradiation output is set as the determination period, and the data of the signal intensity of the thermal radiation light and the data of the signal intensity of the plasma light within the determination period are respectively extracted.

Specifically, first, time ranges respectively corresponding to slow-up portion t1, flat portion t2, and slow-down portion t3 in the irradiation output waveform of the laser beam are specified. For example, in the irradiation output waveform of the laser beam illustrated in (a) of FIG. 14, regions having three different slopes of positive, zero, and negative are specified by, for example, obtaining an approximate straight line. The time ranges corresponding to regions having the respective slopes are obtained. Here, the region having the positive slope corresponds to slow-up portion t1, the region having the zero slope corresponds to flat portion t2, and the region having the negative slope corresponds to slow-down portion t3.

Next, the region having the zero slope, that is, the time range of flat portion t2 of the irradiation output waveform, in which the laser beam has a constant irradiation output, is set as the determination period, and in the data of the signal intensity of the thermal radiation light and the data of the signal intensity of the plasma light which are acquired, data of the signal intensity of the thermal radiation light and data of the signal intensity of the plasma light within the determination period are extracted.

Setting of the output waveform of the laser beam illustrated in FIG. 3 may be used to specify the time ranges of the slow-up portion, the flat portion, and the slow-down portion. In this case, since the trapezoidal shape is clearer than that in a case where the irradiation output waveform of the laser beam is used, it is possible to more easily specify the time range (section T1 to T2 in FIG. 3) corresponding to the flat portion. On the other hand, the irradiation output waveform of the laser beam is the output of the irradiation light during actual laser welding. Therefore, by using the irradiation output waveform of the laser beam, it is possible to more accurately specify the determination period and extract the data. This is because the irradiation output waveform of the laser beam that is actually output is affected by an optical design or the like, and does not necessarily match a preset output waveform of the laser beam.

Figure 15:
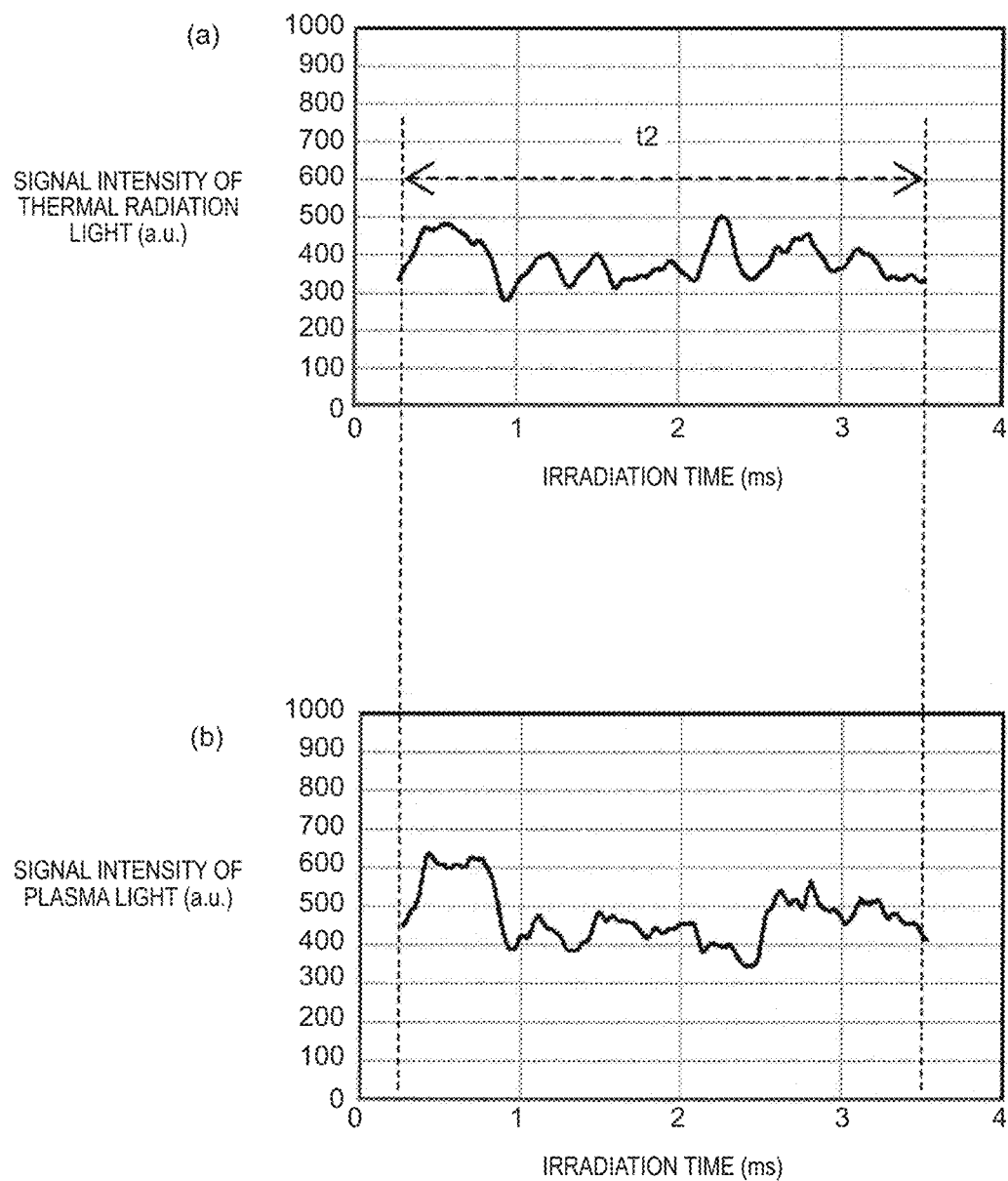
FIG. 15 is an execution result of step S103 in the determination flowchart of the welding state of FIG. 13, and is a view illustrating (a) a signal intensity of the thermal radiation light during an extracted determination period and (b) a signal intensity of the plasma light in the extracted determination period of a welded product having a minute welding abnormality.

The result of executing step S103 is illustrated in FIG. 15. (a) of FIG. 15 illustrates the signal intensity of the thermal radiation light in extracted determination period t2, and (b) of FIG. 15 illustrates the signal intensity of the plasma light in extracted determination period t2.

<<Signal Normalization Method>>

Next, the signal normalization in step S104 of the determination process of the welding states illustrated in FIG. 13 will be described in detail with reference to FIG. 16. In order to obtain the difference signal between the thermal radiation light and the plasma light, it is necessary to match respective absolute intensity levels. The signal intensity of the thermal radiation light depends on a sensitivity and a size of the light receiving sensor, light attenuation by an optical system until reaching the light receiving sensor, an amplification factor in the signal processing circuit, or the like. The same applies to the plasma light. Therefore, preferably, in step S104 in FIG. 13, the signal intensities of the thermal radiation light and the plasma light extracted in step S103 are normalized.

The signal normalization method will be specifically described below.

First, for the welded product of 1, an average value $m_{av}$ of the signal intensity of the thermal radiation light within determination period t2 and an average value $n_{av}$ of the signal intensity of the plasma light within determination period t2 are calculated. Next, a difference between a time function H(t) of the signal intensity of the thermal radiation light within determination period t2 and the average value $m_{av}$, and a difference between a time function. S(t) of the signal intensity of the plasma light within determination period t2 and the average value $n_{av}$ are calculated, and further divided by the average values $m_{av}$ and $n_{av}$, respectively, to obtain normalization signals Hm1(t) and Sn1(t) of the time function of the thermal radiation light and the time function of the plasma light within determination period t2. That is, the normalization signals Hm1(t) and Sn1(t) satisfy the following expressions, respectively.

$$Hm1(t)=(H(t)-m_{av})/m_{av} \quad \text{[Equation 5]}$$

$$Sn1(t)=(S(t)-n_{av})/n_{av} \quad \text{[Equation 6]}$$

In step S104 of the determination process of the welding states illustrated in FIG. 13, signal intensity processor 32 executes the above calculation on each of the signal intensity of the thermal radiation light and the signal intensity of the plasma light acquired by measurement device 20. Then, the normalization signal of the thermal radiation light within determination period t2 and the normalization signal of the plasma light within determination period t2 are obtained.

The normalization of the signal intensity of the thermal radiation light and the signal intensity of the plasma light can be performed by using different methods. Other signal normalization methods will be described in detail below.

First, in advance, as a reference value, time function $m_{av}(t)$ of an average signal intensity of the thermal radiation light of a plurality of normal welded products and time function $n_{av}(t)$ of an average signal intensity of the plasma light are calculated. Next, a difference between the time function H(t) of the signal intensity of the thermal radiation light within determination period t2 and a time function $m_{av}(t)$ of the average signal intensity of the thermal radiation light of a reference value, and a difference between the time function S(t) of the signal intensity of the plasma light within determination period t2 and a time function $n_{av}(t)$ of the average signal intensity of the plasma light of a reference value are calculated, and further divided by the time function $m_{av}(t)$ of the average signal intensity of the thermal radiation light and the time function $n_{av}(t)$ of the average signal intensity of the plasma light respectively, to obtain the normalization signals Hm2(t) and Sn2(t) of the time function of the thermal radiation light and the time function of the plasma light within determination period t2. That is, the normalization signals Hm2(t) and Sn2(t) satisfy the following expressions, respectively.

$$Hm2(t)=(H(t)-m_{av}(t))/m_{av}(t) \quad \text{[Equation 7]}$$

$$Sn2(t)=(S(t)-n_{av}(t))/n_{av}(t) \quad \text{[Equation 8]}$$

Such normalization signals Hm2(t) and Sn2(t) are particularly useful, for example, in a case where a portion except for the slow-up portion and slow-down portion is not flat in the output waveform of the set laser beam. This is because the normalization method can perform normalization including the vertical fluctuation of the output intensity in the output waveform of the laser beam included in the portion excluding the slow-up portion and the slow-down portion.

Figure 16:
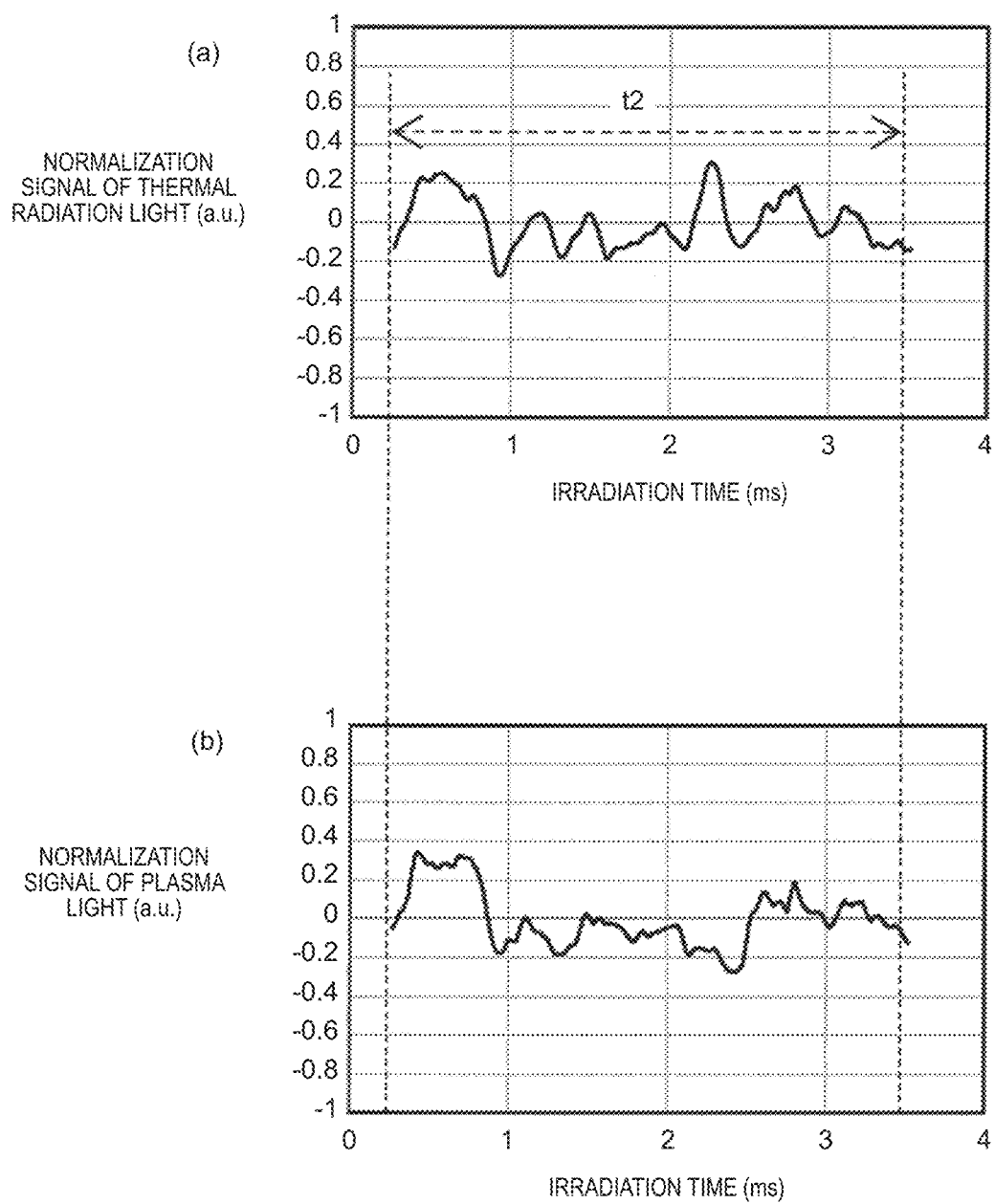
FIG. 16 is an execution result of step S104 in the determination flowchart of the welding state of FIG. 13, and is a view illustrating (a) a normalization signal of the thermal radiation light in the determination period and (b) a normalization signal of the plasma light in the determination period of a welded product having a minute welding abnormality.

The result of executing step S104 is illustrated in FIG. 16. (a) of FIG. 16 is the normalization signal of the thermal radiation light within determination period t2, and (b) of FIG. 16 is the normalization signal of the plasma light in determination period t2.

<<Calculation Method of Difference Signal>>

Next, the calculation of the difference signal in step S105 of the determination process of the welding state illustrated in FIG. 13 will be described in detail with reference to FIGS. 17A to 17C. In step S105, the difference signal in determination period t2 is calculated by obtaining the difference between the normalization signal of the thermal radiation light and the normalization signal of the plasma light obtained in step S104.

Here, the difference signal is preferably calculated as an absolute value. By calculating the absolute value of the difference signal, when the signal intensity of the peak of the difference signal, which will be described later, is determined, the determination reference value may be set to a positive value and therefore the setting becomes simple. In a case where the absolute value of the difference signal is not calculated, when the difference signal is calculated by subtracting the signal intensity of plasma light from the signal intensity of thermal radiation light, the determination reference value is set to a positive value. When the difference signal is calculated by subtracting the signal intensity of the thermal radiation light from the signal intensity of the plasma light, the determination reference value is set to a negative value.

The signal intensity of the thermal radiation light includes a first thermal radiation light intensity (for example, −0.05) indicating the intensity of the thermal radiation light at a first time point (for example, an irradiation time of 2.0 ms) during the welding, and a second thermal radiation light intensity (for example, 0.3) indicating the intensity of the thermal radiation light at a second time point (for example, an irradiation time of 2.2 ms) during the welding. The signal intensity of the plasma light includes a first plasma light intensity (for example, −0.05) indicating the intensity of the plasma light at a first time point (for example, an irradiation time of 2.0 ms) and a second plasma light intensity (for example, −0.2) indicating the intensity of the plasma light at a second time point (for example, an irradiation time of 2.2 ms). Signal intensity processor 32 may calculate a first difference value (for example, 0) indicating a difference between the first thermal radiation light intensity and the first plasma light intensity, and a second difference value (for example, 0.5) indicating a difference between the second thermal radiation light intensity and the second plasma light intensity to generate a difference signal including the first difference value and the second difference value.

Figure 17A:
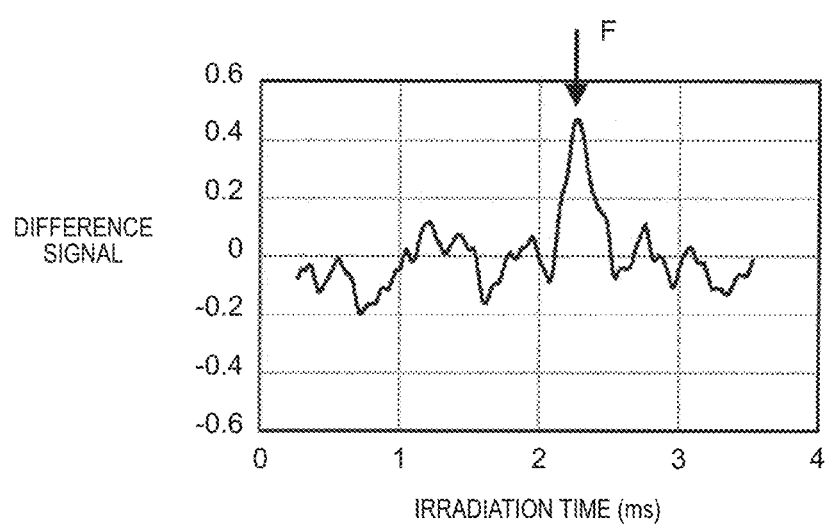
FIG. 17A is an execution result of step S105 in the determination flowchart of the welding state of FIG. 13, and is a graph illustrating a calculation result of a difference signal between a normalization signal of the thermal radiation light and a normalization signal of the plasma light in a determination period of a welded product having a minute welding abnormality.

By executing step S105 of the determination process of the welding state illustrated in FIG. 13, for the thermal radiation light ((b) of FIG. 14) and the plasma light ((c) of FIG. 14) in the determination period of the welded product having the minute welding abnormality, a result of calculating the difference signal in determination period t2 is illustrated in FIG. 17A. The determination of step S106 in FIG. 13 is performed based on the difference signal.

Figure 17B:
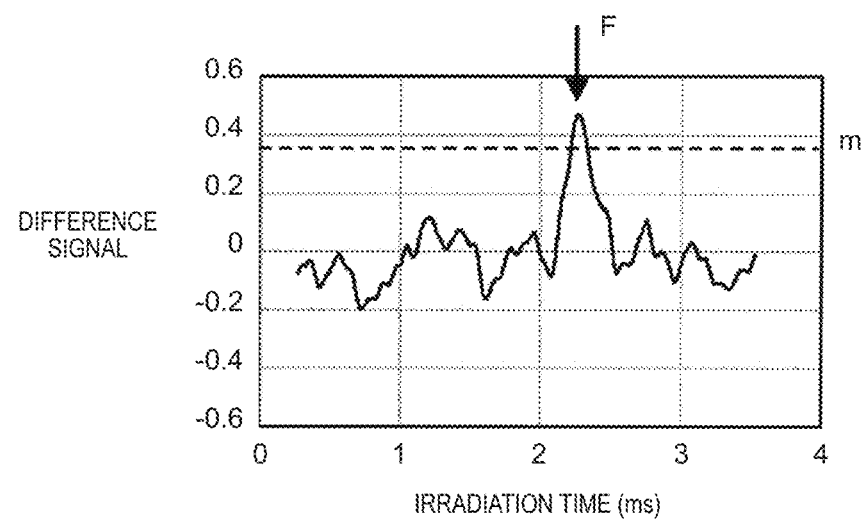
FIG. 17B is an execution result of step S105 in the determination flowchart of the welding state of FIG. 13, and is a graph illustrating a determination of a welded product having a minute welding abnormality by a calculated difference signal.

In step S106 of the determination process of the welding state, for example, the determination reference value is set to 0.35 (illustrated by broken line m of FIG. 17B), and determination of the welded product having the minute welding abnormality by the calculated difference signal is illustrated in FIG. 17B. As illustrated in FIG. 17B, since the difference signal has a peak (indicated by arrow F) having a signal intensity larger than the determination reference value, it is determined as abnormal welding. That is, for the welded product having the minute welding abnormality; in which the occurrence of the abnormal welding is not determined by the welding defect determination by the peak intensity of the thermal radiation light of the related art ((b) of FIG. 14), the abnormal welding can be accurately determined by the determination by the difference signal according to the disclosure.

Figure 17C:
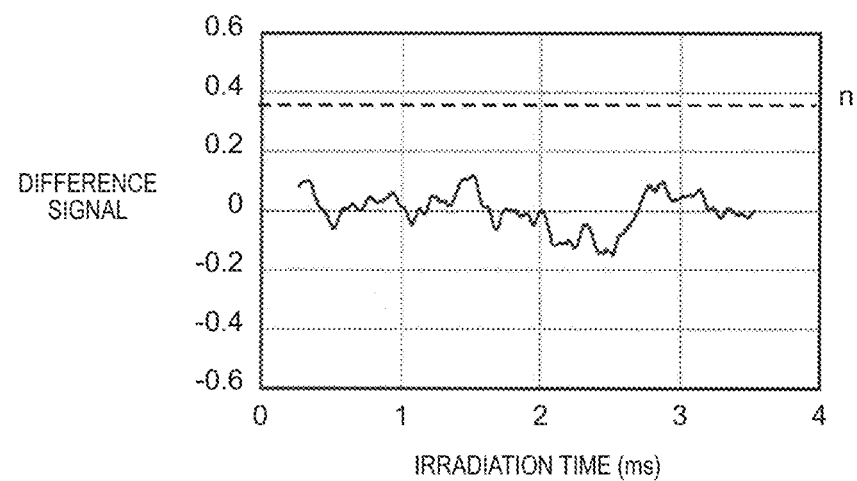
FIG. 17C is an execution result of step S105 in the determination flowchart of the welding state of FIG. 13, and is a graph illustrating a determination of a normal welded product by a calculated difference signal.

On the other hand, FIG. 17C illustrates the determination of the normal welded product by the calculated difference signal. The determination reference value is also similarly set to 0.35 (indicated by broken line n of FIG. 17C). In this case, since there is no peak having a signal intensity larger than the determination reference value in the difference signal, it is determined as normal welding.

<<Verification of Welding State Determination According to Disclosure>>

Figure 18A:
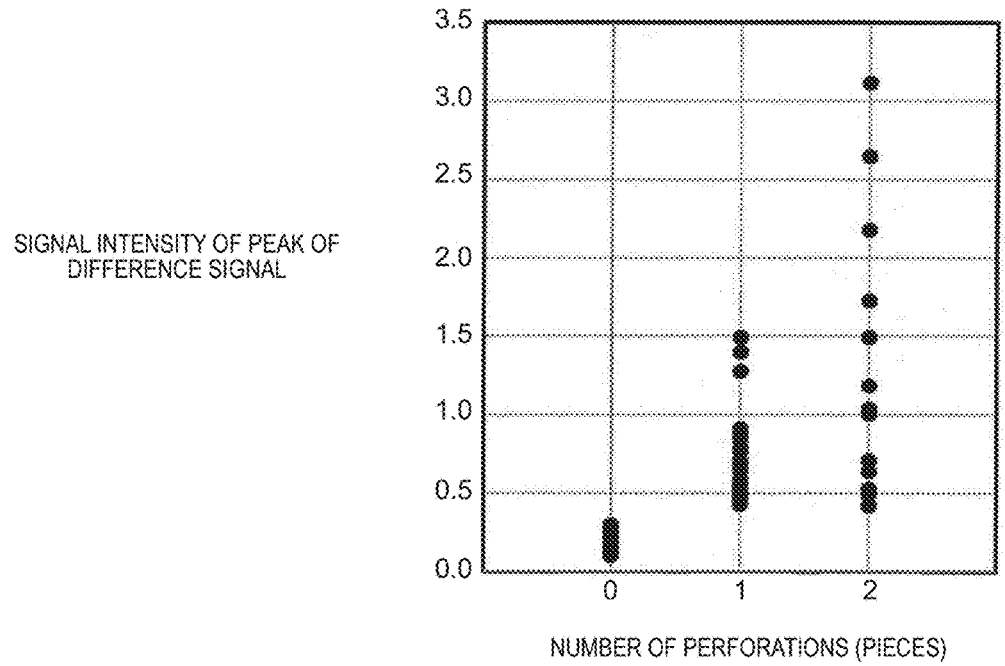
FIG. 18A is a diagram illustrating a difference signal between a normalization signal of the thermal radiation light and a normalization signal of the plasma light in a determination period of a welded product having a plurality of different welding states in the determination of the welding state according to the disclosure, and is a graph illustrating signal intensities of peaks in difference signals of a plurality of welded products.
Figure 18B:
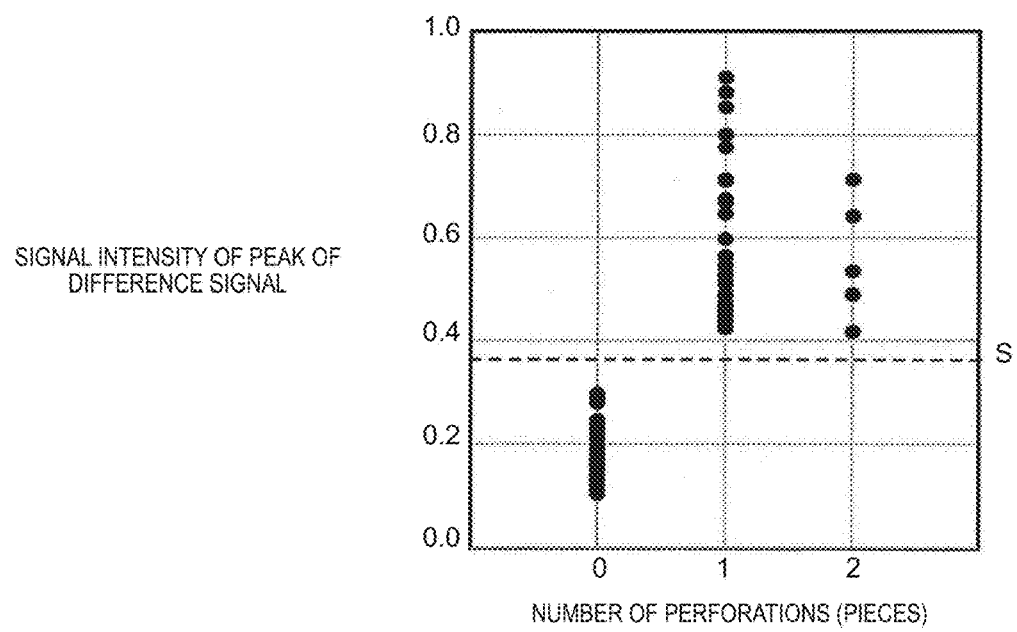
FIG. 18B is a diagram illustrating a difference signal between a normalization signal of the thermal radiation light and a normalization signal of the plasma light in a determination period of a welded product having a plurality of different welding states in the determination of the welding state according to the disclosure, and is an enlarged graph illustrating a portion where the signal intensities of the peaks in the difference signals of a plurality of welded products are equal to or less than 1.0.

By using the determination method of the welding state according to the disclosure described above, as in FIG. 7A and FIG. 7B, verification of the welding state determination was performed by using a total of 89 welded products, 51 normal welded products, and 38 abnormal welded products. FIG. 18A and FIG. 18B illustrate difference signals between the normalization signal of the thermal radiation light and the normalization signal of the plasma light in the determination period of the welded product having a plurality of different welding states in the determination of the welding state according to the disclosure. FIG. 18A illustrates signal intensities of peaks in difference signals of a plurality of welded products. A horizontal axis represents the number of perforations generated in the melted and solidified portion, and a vertical axis represents the signal intensity of the peak in the difference signal of the determination period. Even if one perforation is generated, welding defect occurs and if two perforations are generated, the welding defect state becomes worse. In order to more clearly illustrate the determination of normality/abnormality, FIG. 18B is an enlarged view of a portion where the signal intensity of the peak in the difference signals of the plurality of welded products illustrated in FIG. 18A is equal to or less than 1.0.

As illustrated in FIGS. 18A and 18B, in the normal welded products, the signal intensities of the peaks of the difference signals within the determination period are all equal to or less than approximately 0.3. On the other hand, in the abnormal welded products having 1 to 2 perforations, the signal intensities of the peaks in the difference signals within the determination period are all equal to or more than approximately 0.4.

Here, for example, in a case where the determination reference value is 0.35 (indicated by broken line s in FIG. 18B) that is the signal intensity of the peak of the difference signal, all 51 normal welded products are determined as normal welding, and all 38 abnormal welded products having 1 to 2 perforations are determined as abnormal welding. That is, in the determination result of the welding state according to the present exemplary embodiment illustrated in FIG. 19, among a total 38 abnormal welded products, an erroneous determination does not occur, the erroneous determination rate is 0%, and the correct determination rate is 100%. Therefore, the welding state determination method according to the disclosure can determine the welding abnormality with higher accuracy.

The disclosure is not limited to the exemplary embodiments described above, and can be implemented in various other modes. For example, in the above description, the overlapping laser process is described as an example, but the disclosure is not limited to this. Similar effects can be obtained even when processing with other types of lasers is used.

While the disclosure is fully described in connection with the preferred exemplary embodiments with reference to the accompanying drawings, various variations and modifications will be apparent to those skilled in the art. It is to be understood that such variations and modifications are included within the scope of the disclosure as long as they do not depart from the scope of the disclosure as defined by the appended claims.

For example, signal intensity processor 32 determines whether or not the welded portion includes an abnormality based on the signal intensity of the thermal radiation light during determination period t2 and the signal intensity of the plasma light during determination period t2, but the disclosure is not limited to this. Signal intensity processor 32 may determine whether or not the welded portion includes an abnormality based on the signal intensity of the thermal radiation light during entire period (t1 to t3) and the signal intensity of the plasma light during entire period (t1 to t3).

Signal intensity processor 32 determines whether or not the welded portion includes an abnormality based on the normalized signal intensity of the thermal radiation light and the normalized signal intensity of the plasma light, but the disclosure is not limited to this. Signal intensity processor 32 may determine whether or not the welded portion includes an abnormality based on an unnormalized signal intensity of the thermal radiation light and an unnormalized signal intensity of the plasma light.

Signal intensity processor 32 determines whether or not the welded portion includes an abnormality based on the difference signal indicating the difference between the signal intensity of the thermal radiation light and the signal intensity of the plasma light, but the disclosure is not limited to this. Signal intensity processor 32 may determine whether or not the welded portion includes an abnormality based on a ratio signal indicating a ratio of the signal intensity of the thermal radiation light and the signal intensity of the plasma light.

The laser welding quality inspection method and the laser welding quality inspection apparatus of the disclosure can accurately determine even with the minute welding abnormality by the signal intensity of the peak in the difference signal between the thermal radiation light and the plasma light generated during the welding, and can prevent the abnormal welded product from flowing out to the subsequent process of the laser welding process.

What is claimed is:

1. A laser welding quality inspection method of a welded portion between a joining object and a joined object, when the joining object and the joined object are welded by being irradiated with a laser beam, the method comprising:
    acquiring first data indicating a signal intensity of thermal radiation light radiated from the welded portion during the welding;
    acquiring second data indicating a signal intensity of plasma light radiated from the welded portion during the welding; and
    determining whether or not the welded portion includes an abnormality based on a difference between the signal intensity of the thermal radiation light and the signal intensity of the plasma light which are acquired,
    wherein the determining whether or not the welded portion includes an abnormality based on a comparison between the signal intensity of the thermal radiation light and the signal intensity of the plasma light which are acquired includes:
        calculating a difference signal indicating the difference between the signal intensity of the thermal radiation light and the signal intensity of the plasma light,
        determining that the welded portion includes an abnormality when the calculated difference signal includes a peak having a signal intensity larger than a preset determination reference value, and
        acquiring an irradiation output waveform indicating an intensity of irradiation light of the laser beam by measuring the irradiation light of the laser beam during the welding, wherein the calculating a difference signal indicating a difference between the signal intensity of the thermal radiation light and the signal intensity of the plasma light includes:
  setting, as a determination period, a period during which the intensity of the irradiation light of the laser beam is constantly maintained, based on the irradiation output waveform,
  extracting the signal intensity of the thermal radiation light within the determination period and the signal intensity of the plasma light within the determination period respectively from the signal intensity of the thermal radiation light and the signal intensity of the plasma light which are acquired, and
  calculating a difference between the signal intensity of the thermal radiation light within the determination period and the signal intensity of the plasma light within the determination period, as the difference signal.

2. The laser welding quality inspection method of claim 1, wherein the calculating a difference signal indicating a difference between the signal intensity of the thermal radiation light within the determination period and the signal intensity of the plasma light within the determination period includes:
  calculating a normalization signal of the thermal radiation light and a normalization signal of the plasma light by respectively normalizing the signal intensity of the thermal radiation light within the determination period and the signal intensity of the plasma light within the determination period, and
  calculating a difference signal indicating a difference between the normalization signal of the thermal radiation light and the normalization signal of the plasma light.

3. The laser welding quality inspection method of claim 2, wherein in the calculating a normalization signal of the thermal radiation light and a normalization signal of the plasma light, the following expressions are satisfied $$Hm(t)=(H(t)-m_{av})/m_{av} \quad \text{[Equation 1]}:$$

$$Sn(t)=(S(t)-n_{av})/n_{av} \quad \text{[Equation 2]}:$$

where $m_{av}$ is an average value of the signal intensity of the thermal radiation light within the determination period,
$n_{av}$ is an average value of the signal intensity of the plasma light within the determination period,
$H(t)$ is a time function of the signal intensity of the thermal radiation light before being normalized within the determination period,
$S(t)$ is a time function of the signal intensity of the plasma light before being normalized within the determination period,
$Hm(t)$ is a time function of the normalization signal of the thermal radiation light within the determination period, and
$Sn(t)$ is a time function of the normalization signal of the plasma light within the determination period.

4. The laser welding quality inspection method of claim 2, wherein in the calculating a normalization signal of the thermal radiation light and a normalization signal of the plasma light, the following expressions are satisfied $$Hm(t)=(H(t)-m_{av}(t))/m_{av}(t) \quad \text{[Equation 3]}:$$

$$Sn(t)=(S(t)-n_{av}(t))/n_{av}(t) \quad \text{[Equation 4]}:$$

where $m_{av}(t)$ is an average value of a time function of the signal intensity of the thermal radiation light of a plurality of times of welding determined to have no abnormality in the welded portion within the determination period,
$n_{av}(t)$ is an average value of a time function of the signal intensity of the plasma light of the plurality of times of welding within the determination period,
$H(t)$ is a time function of the signal intensity of the thermal radiation light before being normalized within the determination period,
$S(t)$ is a time function of the signal intensity of the plasma light before being normalized within the determination period,
$Hm(t)$ is a time function of the normalization signal of the thermal radiation light within the determination period, and
$Sn(t)$ is a time function of the normalization signal of the plasma light within the determination period.

5. A laser welding quality inspection method of a welded portion between a joining object and a joined object, when the joining object and the joined object are welded by being irradiated with a laser beam, the method comprising:
  acquiring first data indicating a signal intensity of thermal radiation light radiated from the welded portion during the welding;
  acquiring second data indicating a signal intensity of plasma light radiated from the welded portion during the welding; and
  determining whether or not the welded portion includes an abnormality based on a difference between the signal intensity of the thermal radiation light and the signal intensity of the plasma light which are acquired,
  wherein the signal intensity of the thermal radiation light includes a first thermal radiation light intensity indicating an intensity of the thermal radiation light at a first time point during the welding, and a second thermal radiation light intensity indicating an intensity of the thermal radiation light at a second time point different from the first time point during the welding,
  wherein the signal intensity of the plasma light includes a first plasma light intensity indicating an intensity of the plasma light at the first time point and a second plasma light intensity indicating an intensity of the plasma light at the second time point, and
  wherein the comparison between the signal intensity of the thermal radiation light and the signal intensity of the plasma light includes calculating a first difference value indicating a difference between the first thermal radiation light intensity and the first plasma light intensity, and a second difference value indicating a difference between the second thermal radiation light intensity and the second plasma light intensity, and generating a difference signal including the first difference value and the second difference value.

6. The laser welding quality inspection method of claim 5, wherein the determining whether or not the welded portion includes an abnormality based on a comparison between the signal intensity of the thermal radiation light and the signal intensity of the plasma light which are acquired includes
  calculating a difference signal indicating the difference between the signal intensity of the thermal radiation light and the signal intensity of the plasma light, and
  determining that the welded portion includes an abnormality when the calculated difference signal includes a peak having a signal intensity larger than a preset determination reference value.

7. The laser welding quality inspection method of claim 6, further comprising:
acquiring an irradiation output waveform indicating an intensity of irradiation light of the laser beam by measuring the irradiation light of the laser beam during the welding,
wherein the calculating a difference signal indicating a difference between the signal intensity of the thermal radiation light and the signal intensity of the plasma light further includes
setting, as a determination period, a period during which the intensity of the irradiation light of the laser beam is constantly maintained, based on the irradiation output waveform, and
extracting the signal intensity of the thermal radiation light within the determination period and the signal intensity of the plasma light within the determination period respectively from the signal intensity of the thermal radiation light and the signal intensity of the plasma light which are acquired, and
wherein the calculating a difference signal indicating a difference between the signal intensity of the thermal radiation light and the signal intensity of the plasma light includes calculating a difference between an intensity of the thermal radiation light within the determination period and an intensity of the plasma light within the determination period.

8. The laser welding quality inspection method of claim 7, wherein the calculating a difference signal indicating a difference between the signal intensity of the thermal radiation light within the determination period and the signal intensity of the plasma light within the determination period includes:
calculating a normalization signal of the thermal radiation light and a normalization signal of the plasma light by respectively normalizing the signal intensity of the thermal radiation light within the determination period and the signal intensity of the plasma light within the determination period, and
calculating a difference signal indicating a difference between the normalization signal of the thermal radiation light and the normalization signal of the plasma light.

9. The laser welding quality inspection method of claim 8, wherein in the calculating a normalization signal of the thermal radiation light and a normalization signal of the plasma light, the following expressions are satisfied $$Hm(t)=(H(t)-m_{av})/m_{av} \quad \text{[Equation 1]}$$

$$Sn(t)=(S(t)-n_{av})/n_{av} \quad \text{[Equation 2]}$$

where $m_{av}$ is an average value of the signal intensity of the thermal radiation light within the determination period,
$n_{av}$ is an average value of the signal intensity of the plasma light within the determination period,
H(t) is a time function of the signal intensity of the thermal radiation light before being normalized within the determination period,
S(t) is a time function of the signal intensity of the plasma light before being normalized within the determination period,
Hm(t) is a time function of the normalization signal of the thermal radiation light within the determination period, and
Sn(t) is a time function of the normalization signal of the plasma light within the determination period.

10. The laser welding quality inspection method of claim 8, wherein in the calculating a normalization signal of the thermal radiation light and a normalization signal of the plasma light, the following expressions are satisfied $$Hm(t)=(H(t)-m_{av}(t))/m_{av}(t) \quad \text{[Equation 3]}$$

$$Sn(t)=(S(t)-n_{av}(t))/n_{av}(t) \quad \text{[Equation 4]}$$

where $m_{av}(t)$ is an average value of a time function of the signal intensity of the thermal radiation light of a plurality of times of welding determined to have no abnormality in the welded portion within the determination period,
$n_{av}(t)$ is an average value of a time function of the signal intensity of the plasma light of the plurality of times of welding within the determination period,
H(t) is a time function of the signal intensity of the thermal radiation light before being normalized within the determination period,
S(t) is a time function of the signal intensity of the plasma light before being normalized within the determination period,
Hm(t) is a time function of the normalization signal of the thermal radiation light within the determination period, and
Sn(t) is a time function of the normalization signal of the plasma light within the determination period.

* * * * *